United States Patent
Katoh et al.

(10) Patent No.: US 10,113,078 B2
(45) Date of Patent: Oct. 30, 2018

(54) INK DISCHARGE DEVICE AND INK DISCHARGE METHOD

(71) Applicants: Keita Katoh, Superior, CO (US); Hiroshi Gotou, Kanagawa (JP); Takahiro Yoshida, Ibaraki (JP); Akihiko Matsuyama, Kanagawa (JP); Masahiko Ishikawa, Shizuoka (JP); Yoshiki Yanagawa, Kanagawa (JP)

(72) Inventors: Keita Katoh, Superior, CO (US); Hiroshi Gotou, Kanagawa (JP); Takahiro Yoshida, Ibaraki (JP); Akihiko Matsuyama, Kanagawa (JP); Masahiko Ishikawa, Shizuoka (JP); Yoshiki Yanagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/783,180

(22) Filed: Oct. 13, 2017

(65) Prior Publication Data
US 2018/0105711 A1    Apr. 19, 2018

(30) Foreign Application Priority Data

Oct. 17, 2016   (JP) .................................. 2016-203468
Dec. 12, 2016   (JP) .................................. 2016-240636

(51) Int. Cl.
*G01D 11/00*    (2006.01)
*C09D 11/107*   (2014.01)
(Continued)

(52) U.S. Cl.
CPC .............. *C09D 11/107* (2013.01); *B41J 2/145* (2013.01); *B41J 2/14145* (2013.01);
(Continued)

(58) Field of Classification Search
CPC .... C09D 11/30; C09D 133/14; C09D 11/107; C08F 222/10
(Continued)

(56) References Cited

U.S. PATENT DOCUMENTS 9,353,274 B1 *   5/2016   Katoh ................. C09D 133/14
9,850,391 B2 *  12/2017   Fukuoka .............. C09D 11/104
(Continued)

FOREIGN PATENT DOCUMENTS

JP   54-059936   5/1979
JP   56-064877   6/1981
(Continued)

*Primary Examiner* — An Do
(74) *Attorney, Agent, or Firm* — Oblon, McClelland, Maier & Neustadt, L.L.P.

(57) ABSTRACT

An ink discharge device including an ink, an ink discharge head, and a negative pressure generator is provided. The ink comprises water, a colorant, an organic solvent X having a
(Continued)

solubility parameter of from 8.9 to 12.0 and comprising no glycol ether compound, and a copolymer comprising a structural unit represented by the following formula (1):

Formula (1)

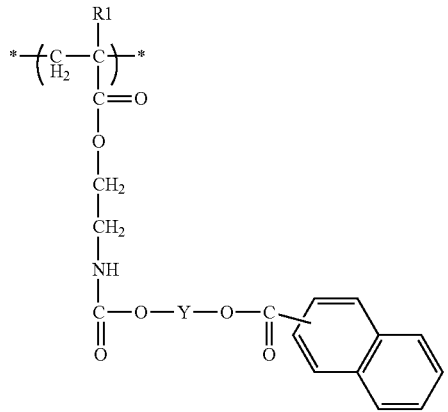

where R1 represents a hydrogen atom or methyl group and Y represents an alkylene group having 2 to 18 carbon atoms. The ink discharge head includes a nozzle to discharge the ink, a plurality of individual liquid chambers in communication with the nozzle, a flow-in channel to let the ink flow into the individual liquid chambers, and a flow-out channel to let the ink flow out from the individual liquid chambers. The negative pressure generator is configured to generate a negative pressure that lets the ink flow out from the individual liquid chambers.

12 Claims, 10 Drawing Sheets

(51) Int. Cl.
*B41J 2/145* (2006.01)
*B41J 2/14* (2006.01)
*C09D 11/322* (2014.01)
*C09D 11/033* (2014.01)
*C09D 11/36* (2014.01)
*C09D 11/326* (2014.01)

(52) U.S. Cl.
CPC ....... *B41J 2/14201* (2013.01); *B41J 2/14314* (2013.01); *C09D 11/033* (2013.01); *C09D 11/322* (2013.01); *C09D 11/326* (2013.01); *C09D 11/36* (2013.01)

(58) Field of Classification Search
USPC .......................................... 347/40, 95, 100
See application file for complete search history.

(56) References Cited

U.S. PATENT DOCUMENTS

| | | |
|---|---|---|
| 2015/0062255 A1 | 3/2015 | Sasaki |
| 2015/0125672 A1 | 5/2015 | Katoh et al. |
| 2015/0247049 A1 | 9/2015 | Matsuyama et al. |
| 2015/0291817 A1 | 10/2015 | Katoh et al. |
| 2015/0307734 A1 | 10/2015 | Nonogaki et al. |
| 2015/0376425 A1 | 12/2015 | Hakiri et al. |
| 2016/0017075 A1 | 1/2016 | Harada et al. |
| 2016/0032037 A1 | 2/2016 | Harada et al. |
| 2016/0075892 A1 | 3/2016 | Harada et al. |
| 2016/0102162 A1 | 4/2016 | Harada et al. |
| 2016/0130452 A1 | 5/2016 | Katoh et al. |
| 2016/0168292 A1 | 6/2016 | Fukuoka et al. |
| 2016/0222234 A1 | 8/2016 | Matsuyama et al. |
| 2016/0376455 A1 | 12/2016 | Katoh et al. |
| 2017/0009092 A1 | 1/2017 | Gotou et al. |
| 2017/0022381 A1 | 1/2017 | Takamura et al. |
| 2017/0136785 A1 | 5/2017 | Katoh |

FOREIGN PATENT DOCUMENTS

| | | |
|---|---|---|
| JP | 6-071882 | 3/1994 |
| JP | 2000-053897 | 2/2000 |
| JP | 2001-139849 | 5/2001 |
| JP | 2007-091908 | 4/2007 |
| JP | 2015-071289 | 4/2015 |
| JP | 2016-145313 | 8/2016 |

* cited by examiner

INK DISCHARGE DEVICE AND INK DISCHARGE METHOD

CROSS-REFERENCE TO RELATED APPLICATIONS

This patent application is based on and claims priority pursuant to 35 U.S.C. § 119(a) to Japanese Patent Application Nos. 2016-203468 and 2016-240636, filed on Oct. 17, 2016 and Dec. 12, 2016, respectively, in the Japan Patent Office, the entire disclosure of each of which is hereby incorporated by reference herein.

BACKGROUND

Technical Field

The present disclosure relates to an ink discharge device and an ink discharge method.

Description of the Related Art

Circulation-type heads that circulate a liquid within multiple individual liquid chambers are known as liquid discharge heads (or liquid droplet discharge heads) for discharging liquids.

Inkjet recording methods have advantages such that the process is simple and full colorization is easy in comparison with other recording methods. Therefore, high definition images can be obtained by a device having a simple configuration. For this reason, inkjet recording methods are widely diffusing from home use to office use, commercial printing, and industrial printing. In the fields of commercial printing and industrial printing, coated papers, such as coat paper and art paper, are used in addition to plain paper as recording media and required to exhibit high image density, image gloss, and fixability.

In such inkjet recording methods, dye inks using a water-soluble dye as colorant are generally used. However, because dye inks have poor water resistance and light resistance, pigment inks using a water-insoluble pigment are being developed actively these days. When an image is formed with such a pigment ink on a coated paper sheet, organic solvents in the ink, containing moisture, permeate the coated paper sheet so slowly that some of them remain on the surface of the coated paper sheet. As a result, defective images are produced through transfer or abrasion of the image, raising problems related to drying and fixing properties.

SUMMARY

In accordance with some embodiments of the present invention, an ink discharge device is provided. The ink discharge device includes an ink, an ink discharge head, and a negative pressure generator. The ink comprises water, a colorant, an organic solvent X, and a copolymer. The organic solvent X has a solubility parameter of from 8.9 to 12.0 and comprises no glycol ether compound. The copolymer comprises a structural unit represented by the following formula (1):

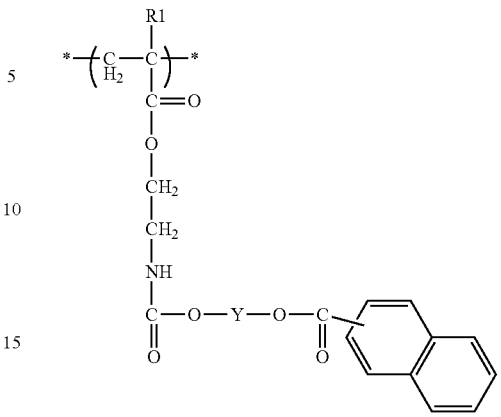

Formula (1)

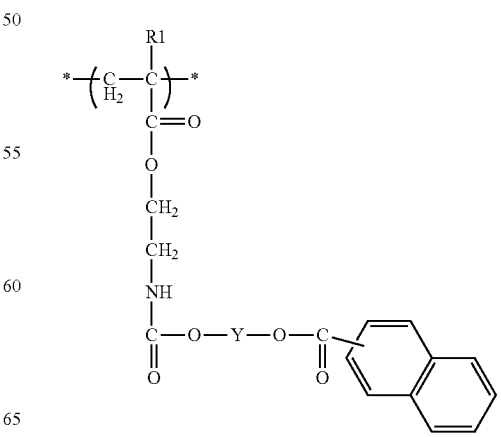

Formula (1)

where R1 represents a hydrogen atom or methyl group and Y represents an alkylene group having 2 to 18 carbon atoms. The ink discharge head includes a nozzle configured to discharge the ink, a plurality of individual liquid chambers in communication with the nozzle, a flow-in channel configured to let the ink flow into the individual liquid chambers, and a flow-out channel configured to let the ink flow out from the individual liquid chambers. The negative pressure generator is configured to generate a negative pressure that lets the ink flow out from the individual liquid chambers. The ink discharge head is configured to let the ink having flowed out from the flow-out channel flow into the flow-in channel to circulate the ink.

In accordance with some embodiments of the present invention, an ink discharge method is provided. The ink discharge method includes the step of: letting an ink flow into multiple individual liquid chambers in communication with a nozzle via a flow-in channel; letting the ink flow out from the multiple individual liquid chambers via a flow-out channel; generating a negative pressure that lets the ink flow out from the individual liquid chambers; and letting the ink having flowed out from the flow-out channel flow into the flow-in channel to circulate the ink. The ink comprises water, a colorant, an organic solvent X, and a copolymer. The organic solvent X has a solubility parameter of from 8.9 to 12.0 and comprises no glycol ether compound. The copolymer comprises a structural unit represented by the following formula (1):

where R1 represents a hydrogen atom or methyl group and Y represents an alkylene group having 2 to 18 carbon atoms.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
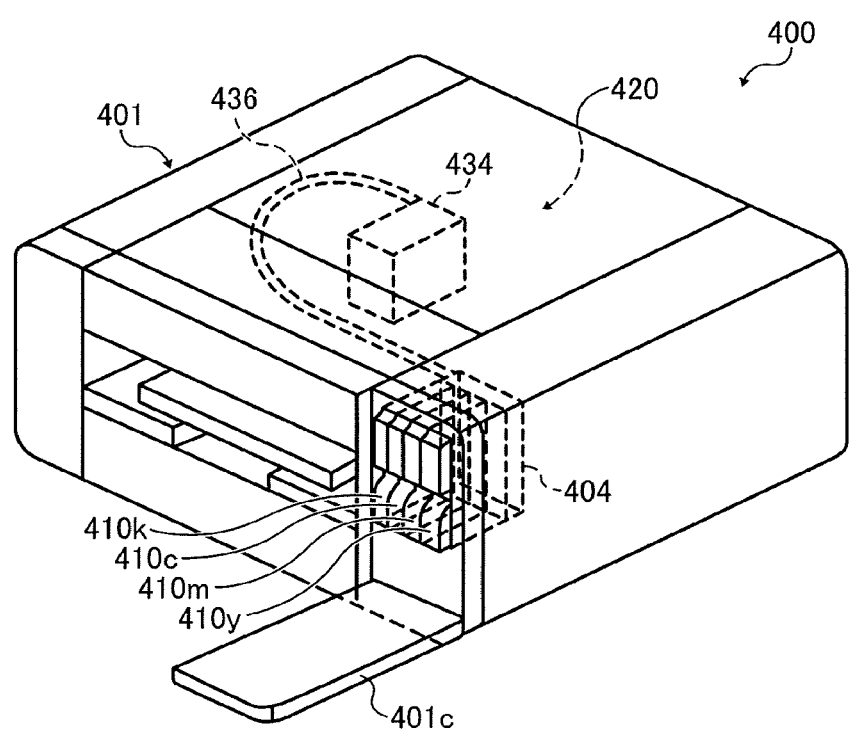
FIG. 1 is a schematic perspective view of an ink discharge device in accordance with some embodiments of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

One drawback of conventional inkjet inks is that, when being continuously discharged for a long period of time, ink discharge becomes unstable, which results in defective images.

In accordance with some embodiments of the present invention, an ink discharge device is provided that is capable of recording high-quality images without beading and blurring, on not only plain paper but also commercial printing paper, while exhibiting high drying property, high productivity, and low maintenance ink consumption.

Ink

In accordance with some embodiments of the present invention, the ink comprises water, a colorant, an organic solvent X having a solubility parameter (SP) of from 8.9 to 12.0 and comprising no glycol ether compound, and a copolymer having a specific structure.

Copolymer Having Specific Structure

The copolymer having a specific structure is described in detail below.

The ink discharge device in accordance with some embodiments of the present invention combines a circulation-type discharge head with an ink containing a solvent having a low solubility parameter (SP). Such a circulation-type discharge head generally requires a negative pressure tank on its circulation channel so as to suppress the ink from flowing out from nozzles. The negative pressure tank is always decompressed by a vacuum pump to keep the pressure in the tank negative. Under such negative pressures, moisture in the ink easily vaporizes and the ink becomes more hydrophobic. As the balance between hydrophilicity and hydrophobicity is thus changed, dispersion stability of the pigment in the ink may deteriorate. A typical polymeric dispersant becomes unstable in such a hydrophobic ink composition to degrade dispersion stability of the pigment. As a result, problematic phenomena such as missing nozzle and bending discharge may be caused. The copolymer comprising a structural unit having the formula (1) has superior solvent resistance than typical copolymers and is capable of stably dispersing pigments even in such a hydrophobic ink composition. Therefore, even after the ink is circulated within the tank under negative pressures, excellent dischargeability and high quality images can be delivered.

A reason for excellent solvent resistance of the copolymer having the formula (1) is considered that naphthyl group on a side chain of the structural unit having the formula (1) strongly adsorbs to the pigment due to hydrophobic interaction.

The copolymer comprises a structural unit represented the following formula (1).

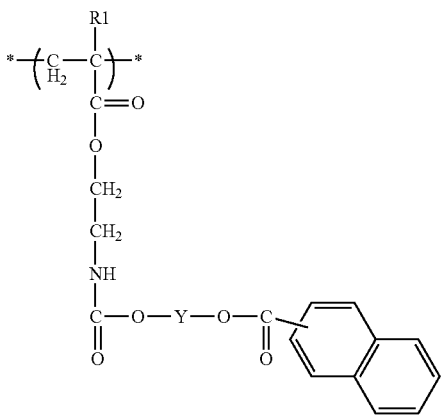

Formula (1)

In the formula (1), R1 represents a hydrogen atom or methyl group, and Y represents an alkylene group having 2 to 18 carbon atoms.

Preferably, the structural unit represented by the formula (1) accounts for 10% to 90% by mol, more preferably 30% to 70% by mol, of the copolymer. When the structural unit represented by the formula (1) accounts for 30% by mol or more of the copolymer, solvent resistance of the ink is improved. When the structural unit represented by the formula (1) accounts for 70% by mol or less of the copolymer, dispersion stability of pigments in the ink is improved.

Preferably, the copolymer comprising the structural unit represented by the formula (1) accounts for 0.1% to 10.0% by mass, more preferably 0.5% to 5.0% by mass, of the ink. When the copolymer accounts for 0.5% by mass or more of the ink, the ink consumption during maintenance is more reduced. When the copolymer accounts for 10.0% by mass or less of the ink, discharge reliability is more improved.

The copolymer can be obtained by polymerizing a monomer represented by the following formula (I) with a polymerizable monomer having an anionic hydrophilic functional group, a polymerizable hydrophobic monomer, and/or a polymerizable surfactant. If needed, a polymerizable monomer having a non-anionic hydrophilic functional group, such as a polymerizable monomer having a cationic hydrophilic functional group and a polymerizable monomer having a nonionic hydrophilic functional group, may also be polymerized together.

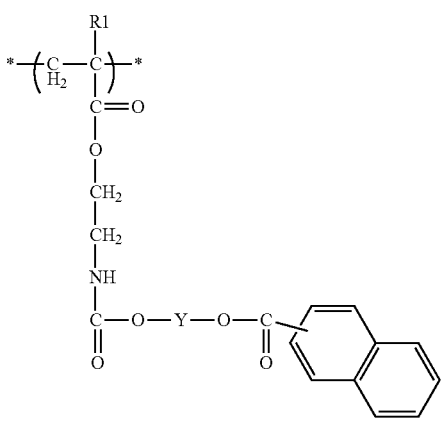

Formula (1)

In the formula (I), R1 represents a hydrogen atom or methyl group, and Y represents an alkylene group having 2 to 18 carbon atoms.

The monomer represented by the formula (I) can be synthesized from conventional monomers, such as 1-vinylnaphthalene and 2-vinylnaphthalene.

Alternatively, the monomer represented by the formula (I) can also be obtained by reacting a reactive compound having a naphthyl group with a polymerizable monomer.

Specific examples of the reactive compound having naphthyl group include, but are not limited to, naphthalenecarboxylic acid hydroxyethyl ester, naphthalenecarboxylic acid hydroxypropyl ester, and naphthalenecarboxylic acid hydroxybutyl ester. Specific examples of the polymerizable monomer to be reacted with the reactive compound include, but are not limited to, 2-acryloyloxyethyl isocyanate and 2-methacryloyloxyethyl isocyanate.

Specific examples of the polymerizable monomer having an anionic hydrophilic functional group include, but are not limited to: unsaturated carboxylic acids such as acrylic acid, methacrylic acid, maleic acid, and itaconic acid; unsaturated phosphoric acids such as 2-methacryloyloxyethyl acid phosphate, 2-acryloyloxyethyl acid phosphate, acid phosphoxy polyoxyethylene glycol methacrylate, and acid phosphoxy poly(oxyethyleneoxypropylene) glycol methacrylate; unsaturated sulfonic acids such as vinyl sulfonic acid, styrenesulfonic acid, 4-styrenesulfonic acid, 2-acrylamide-2-methylpropanesulfonic acid, and 2-hydroxy-3-allyloxy-1-propanesulfonic acid; and anionic unsaturated ethylene monomers such as unsaturated ethylene monomers containing phosphoric acid, phosphonic acid, alendronic acid, or etidronic acid.

Specific examples of the anionic hydrophilic functional group included in the copolymer are listed below, but not limited thereto. Among these anionic hydrophilic functional groups, carboxyl group is preferable. When the anionic hydrophilic functional group is carboxyl group, beading is well suppressed on coated papers.

—$COO^-$, —$SO_3^-$, $PO_3H^-$, —$PO_3^{2-}$, —$CON^{2-}$, —$SO_3N^{2-}$, —$NH-C_6H_4-COO^-$, —$NH-C_6H_4-SO_3^-$, —$NH-C_6H_4-PO_3H^-$, —$NH-C_6H_4-PO_3^{2-}$, —$NH-C_6H_4-CON^{2-}$, —$NH-C_6H_4-SO_3N^{2-}$

Preferably, the copolymer further comprises a structural unit represented by the following formula (2) in addition to the structural unit represented by the formula (1).

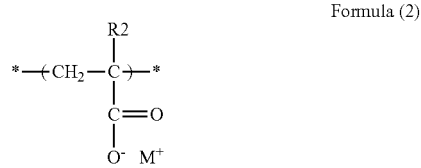

Formula (2)

In the formula (2), R2 represents a hydrogen atom or methyl group, and M represents a hydrogen atom, alkali metal, or organic ammonium.

Preferably, the copolymer is in the form of a salt. In this case, when a base is added to neutralize the copolymer, the added base is present as a cation.

Specific examples of the polymerizable hydrophobic monomer include, but are not limited to: unsaturated ethylene monomers having an aromatic ring, such as ca-methylstyrene, 4-t-butylstyrene, and 4-chloromethylstyrene; alkyl acrylates and methacrylates such as methyl acrylate and methacrylate, ethyl acrylate and methacrylate, n-butyl acrylate and methacrylate, dimethyl maleate, dimethyl itaconate, dimethyl fumarate, lauryl (C12) acrylate and methacrylate, tridecyl (C13) acrylate and methacrylate, tetradecyl (C14) acrylate and methacrylate, pentadecyl (C15) acrylate and methacrylate, hexadecyl (C16) acrylate and methacrylate, heptadecyl (C17) acrylate and methacrylate, nonadecyl (C19) acrylate and methacrylate, eicosyl (C20) acrylate and methacrylate, heneicosyl (C21) acrylate and methacrylate, and docosyl (C22) acrylate and methacrylate; and alkyl-group-containing unsaturated ethylene monomers such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosen, and 1-docosen. Each of these monomers can be used alone or in combination with others.

Examples of the polymerizable surfactant include anionic or non-ionic surfactants having at least one radical-polymerizable unsaturated double bond group in one molecule.

Specific examples of such anionic surfactants include, but are not limited to: hydrocarbon compounds having a sulfate group (e.g., ammonium sulfate group ($-SO_3^-NH_4^+$)) and allyl group ($-CH_2-CH=CH_2$); hydrocarbon compounds having a sulfate group (e.g., ammonium sulfate group ($-SO_3^-NH_4^+$)) and methacrylic group ($-CO-C(CH_3)=CH_2$); and aromatic hydrocarbon compounds having a sulfate group (e.g., ammonium sulfate group ($-SO_3^-NH_4^+$)) and 1-propenyl group ($-CH=CH_2CH_3$). Specific examples of commercially-available products thereof include, but are not limited to: ELEMINOL JS-20 and RS-300 (products of Sanyo Chemical Industries, Ltd.); and AKUARON KH-10, AKUARON KH-1025, AKUARON KH-05, AKUARON HS-10, AKUARON HS-1025, AKUARON BC-0515, AKUARON BC-10, AKUARON BC-1025, AKUARON BC-20, and AKUARON BC-2020 (products of DKS Co., Ltd.).

Specific examples of such non-ionic surfactants include, but are not limited to, hydrocarbon compounds or aromatic hydrocarbon compounds having 1-propenyl group ($-CH=CH_2CH_3$) and a polyoxyethylene group ($-(C_2H_4O)_n-H$). Specific examples of commercially-available products thereof include, but are not limited to: AKUARON RN-20, AKUARON RN-2025, AKUARON RN-30, and AKUARON RN-50 (products of DKS Co., Ltd.); and LATEMUL PD-104, LATEMUL PD-420, LATEMUL PD-430, and LATEMUL PD-450 (products of Kao Corporation).

Each of the above polymerizable surfactants may be used alone or in combination with others.

Specific examples of the polymerizable monomer having a nonionic hydrophilic functional group include, but are not limited to, 2-hydroxyethyl acrylate and methacrylate, diethylene glycol monoacrylate and monomethacrylate, triethylene glycol monoacrylate and monomethacrylate, tetraethylene glycol monoacrylate and monomethacrylate, and polyethylene glycol monoacrylate and monomethacrylate.

Specific examples of the polymerizable monomer having a cationic hydrophilic functional group include, but are not limited to, acrylamide and methacrylamide, N-methylolacrylamide and N-methylolmethacrylamide, N-vinylformamide, N-vinylacetamide, N-vinylpyrrolidone, acrylamide, N,N-dimethylacrylamide, N-t-butylacrylamide, N-octylacrylamide, and N-t-octylacrylamide.

The copolymer may be synthesized by any known method such as solution polymerization, suspension polymerization, bulk polymerization, and emulsion polymerization. Among these, methods using a radical polymerization initiator are preferable because polymerization operation and molecular weight adjustment are easy.

Specific examples of the radical polymerization initiator include, but are not limited to, peroxyketal, hydroperoxide, dialkyl peroxide, diacyl peroxide, peroxydicarbonate, peroxyester, cyano-based compounds such as azobisisobutyronitrile, azobis(2-methylbutyronitrile), and azobis(2,2'-isovaleronitrile), and non-cyano-based compounds such as dimethyl-2-2'-azobisisobutyrate. Among these, organic peroxides and azo-based compounds are preferable because molecular weights are easily controllable and the decomposition temperatures are low. In particular, azo-based compounds are more preferable. Preferably, the used amount of the polymerization initiator is from 1% to 10% by mass of the total mass of the polymerizable monomers.

Preferably, the copolymer has a weight average molecular weight of from 5,000 to 40,000 for improving storage stability of pigment dispersion and ink, image density, gloss value, and discharge reliability.

Preferably, the copolymer is in the form of a salt. In this case, a base added to the ink to neutralize the copolymer is present as a cation.

Preferably, the added amount of the cation is from one to two times the molar number of the anionic hydrophilic functional groups in the copolymer, for improving storage stability of pigment dispersion and ink.

Preferably, the cation is an organic ammonium ion, for improving ink storage stability.

The amount of cation contained in the ink can be calculated either from the formula or by analyzing the ink.

In a case in which the cation is a metallic ion, the amount of cation contained in the ink can be determined by an ICP (Inductively Coupled Plasma) emission spectroscopic analyzer. Specific examples of the ICP emission spectroscopic analyzer include, but are not limited to, ICPE-9000 (product of Shimadzu Corporation) and OPTIMA 8000 (product of PerkinElmer Inc.).

In a case in which the cation is an organic ammonium, the amount of cation contained in the ink can be determined by a GC/MS (Gas Chromatography/Mass Spectrometry) analyzer. Specific examples of the GC/MS analyzer include, but are not limited to, GCMS-QP2010 ULTRA (product of Shimadzu Corporation) and AGILENT 7000C (product of Agilent Technologies, Inc.).

Specific examples of the cation include, but are not limited to, sodium ion, potassium ion, lithium ion, and organic ammonium ions.

Specific examples of the organic ammonium ions include, but are not limited to, tetramethylammonium ion, tetraethylammonium ion, tetrapropylammonium ion, tetrabutylammonium ion, tetrapentylammonium ion, tetrahexylammonium ion, triethylmethylammonium ion, tributylmethylammonium ion, trioctylmethylammonium ion, 2-hydroxyethyltrimethylammonium ion, tris(2-hydroxyethyl)methylammonium ion, propyltrimethyl ammonium ion, hexyltrimethylammonium ion, octyltrimethylammonium ion, nonyltrimethylammonium ion, decyltrimethylammonium ion, dodecyltrimethylammonium ion, tetradecyltrimethylammonium ion, hexadecyltrimethylammonium ion, octadecyltrimethyl ammonium ion, didodecyldimethyl ammonium ion, ditetradecyldimethylammonium ion, dihexadecyldimethylammonium ion, dioctadecyldimethylammonium ion, ethylhexadecyldimethylammonium ion, ammonium ion, dimethylammonium ion, trimethylammonium ion, monoethylammonium ion, diethylammonium ion, triethylammonium ion, monoethanolammonium ion, diethanolammonium ion, triethanolammonium ion, methylethanolammonium ion, methyldiethanolammonium ion, dimethylethanolammonium ion, monopropanolammonium ion, dipropanolammonium ion, tripropanolammonium ion, and isopropanolammonium ion. Preferably, the cation is an organic ammonium ion, for improving ink storage stability and discharge reliability.

Organic Solvent

The ink in accordance with some embodiments of the present invention contains at least one organic solvent X having a solubility parameter of from 8.9 to 12.0 and comprising no glycol ether compound. By including the organic solvent X, the ink improves its wettability to recording media. Thus, the ink compositions can permeate a coated paper sheet even the coated layer thereof is poorly ink-absorptive, as is the case with commercial printing papers, thus suppressing the occurrence of beading.

The organic solvent X having a solubility parameter of from 8.9 to 12.0 and comprising no glycol ether compound exhibits higher permeability for coated papers compared to typical organic solvents. Thus, when the ink is discharged onto a coated paper sheet to become an image, the ink is suppressed from causing beading and remaining on the coated paper sheet, thereby preventing the occurrence of blocking while improving productivity. However, if such an ink containing the organic solvent X is used in combination with a circulation-type discharge head, the ink will be exposed to negative pressures for so long a time that moisture in the ink will vaporize. As a result, the ink composition will become very low in solubility parameter and very high in hydrophobicity. In such a situation, typical dispersants will deteriorate in dispersing function and make pigment dispersion unstable. By contrast, the copolymer comprising the structural unit represented by the formula (1) is capable of stably dispersing pigments even in a highly hydrophobic condition, thus preventing defective image caused by missing nozzle and unstable discharge.

Preferably, the organic solvent X is water-soluble. More preferably, the organic solvent X is selected from the amide compounds represented by the following formulae (3) or (5) and the oxetane compounds represented by the formula (4):

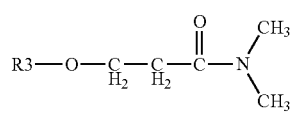

Formula (3)

where R3 represents an alkyl group having 4 to 6 carbon atoms;

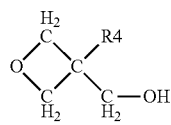

Formula (4)

where R4 represents an alkyl group having 1 to 2 carbon atoms; and

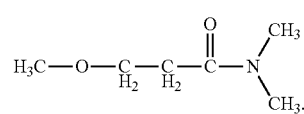

Formula (5)

Generally, organic solvents having a solubility parameter less than 8.9 have very low water solubility and easily separate from water. Therefore, such organic solvents cannot be used for water-based inks. Organic solvents having a solubility parameter in excess of 12.0 have poor drying property and easily cause beading. Therefore, such organic solvents cannot be used for water-based inks either.

The solubility parameter (SP) is defined by the regular solution theory introduced by Hildebrand. The solubility parameter indicates the solubility of a two-component system solution. In the present disclosure, SIP is measured by Fedors' method. SP is represented by a square root of a cohesive energy density defined in the regular solution theory. The unit of SP is $(cal/cm^3)^{0.5}$. SP can be calculated with a popular simplified software program.

Specific examples of the amide compounds represented by the formula (3) include the following compounds represented by respective formulae (3-1) to (3-3),

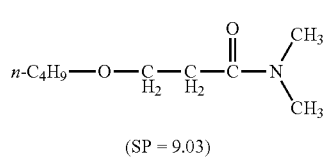

Formula (3-1)

(SP = 9.03)

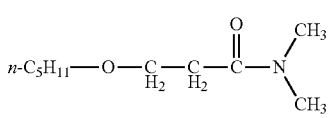

Formula (3-2)

(SP = 9.0)

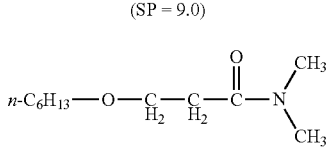

Formula (3-3)

(SP = 8.96)

Specific examples of the oxetane compounds represented by the formula (4) include the following compounds represented by respective formulae (4-1) to (4-2).

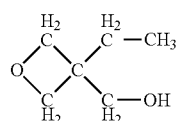

Formula (4-1)

(SP = 11.31)

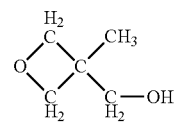

Formula (4-2)

(SP = 11.8)

The amide compound represented by the formula (5) has a solubility parameter of 10.3.

Specific examples of the organic solvent X further include 2-ethyl-1,3-hexanediol (having a solubility parameter of 10.6) and 2,2,4-trimethyl-1,3-pentanediol (having a solubility parameter of 10.8).

Preferably, the organic solvent X accounts for 10% by mass or more, more preferably from 20% to 60% by mass, of the ink. When the organic solvent X accounts for 20% by mass or more of the ink, the occurrence of beading and color bleeding between colors are sufficiently suppressed on commercial printing papers. When the organic solvent X accounts for 60% by mass or less of the ink, viscosity increase of the ink is suppressed and discharge stability is thereby suppressed from degrading.

Preferably, the proportion of the organic solvent X to the total of the water and the organic solvent X in the ink is 20% by mass or more, more preferably from 20% to 60% by mass. When the proportion (organic solvent X/(organic solvent X+water)) is 20% by mass or more, even after the ink is circulated within a circulation-type discharge head under negative pressures for a long time, a sufficient amount of the organic solvent X remains in the ink, thereby securing flowability of the ink and improving discharge reliability. When the proportion (organic solvent X/(organic solvent X+water)) is 60% by mass or less, drying property of the ink is improved.

The ink may further contain a glycol ether compound (hereinafter "compound Z") that exhibits a vapor pressure of 50 mmHg or more at 100° C., as another organic solvent, for more improving drying property. In this case, the ink can be well dried even on commercial printing papers. In addition, even when the resulting image is brought into contact with a conveyance roller immediately after being dried by hot air having a temperature of 100° C., the image will not be transferred onto the conveyance roller, thus providing high-speed productivity. The compound Z vaporizes much easier than the organic solvent X having a solubility parameter of from 8.9 to 12.0. In a case in which the ink contains both the organic solvent X and the compound Z and is used in a circulation-type discharge head, the compound Z vaporizes prior to the organic solvent X, thus more easily making the ink solvent more hydrophobic.

Preferably, the compound Z is soluble in high-purity water. Specific examples of such materials include, but are not limited to, propylene glycol monopropyl ether (having a boiling point ("b.p.") of 150° C. and a vapor pressure of 107 mmHg), propylene glycol monoethyl ether (having a b.p. of 133° C. and a vapor pressure of 252 mmHg), propylene glycol monomethyl ether (having a b.p. of 120° C. and a vapor pressure of 360 mmHg), and propylene glycol monobutyl ether (having a b.p. of 170° C. and a vapor pressure of 59 mmHg).

Preferably, the mass ratio of the organic solvent X to the compound Z in the ink is from 1/1 to 8/1, more preferably from 3/1 to 5/1. When the ratio is equal to or greater than 1/1, in other words, the content of the organic solvent X is equal to or greater than that of the compound Z, the ink is suppressed from being overdried. Therefore, the inside of the inkjet head will not be dried and discharge stability will not be degraded. When the ratio is equal to or less than 8/1, it means that the content of the organic solvent X is not excessive. Therefore, drying property on commercial printing papers will not deteriorate and thereby productivity will not deteriorate.

In the present disclosure, organic solvents are divided into the following three groups: the first group consisting of organic solvents falling into the organic solvent X (having a solubility parameter of from 8.9 to 12.0 and comprising no glycol ether compound), the second group consisting of organic solvents falling into the compound Z (i.e., a glycol ether compound that exhibits a vapor pressure of 50 mmHg or more at 100° C.); and the third group consisting of organic solvents falling into neither the organic solvent X nor the compound Z.

Preferably, the total content rate of organic solvents in the ink, including the organic solvent X and the compound Z, is in the range of from 20% to 60% by mass. When the total content rate is 20% by mass or more, it is prevented that beading suppressing effect on commercial printing papers deteriorates. When the total content rate is 60% by mass or less, it is prevented that viscosity of the ink drastically increases to cause a problem in discharge stability.

Other Solvent (Moisturizer)

The ink may further contain a solvent other than the organic solvent X or the glycol ether compound (i.e., compound Z) as a moisturizer. Specific preferred examples of the moisturizer include polyols. Specific examples of the polyols include, but are not limited to, glycerin, triethylene glycol, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol.

Water

The water contained in the ink may be pure water such as ion-exchange water, ultrafiltration water, reverse osmosis water, and distilled water; high-purity water; or ultrapure water. Preferably, the content rate of water in the ink is in the range of from 20% to 60% by mass.

Colorant

Examples of the colorant include pigments dispersible with surfactants, pigments dispersible with resins, resin-coated pigments, and self-dispersible pigments having hydrophilic group on their surfaces. Preferably, the colorant is water-dispersible. Among these colorants, resin-coated pigments and self-dispersible pigments which have at least one hydrophilic group on their surfaces are preferable.

Specific examples of the hydrophilic group include, but are not limited to, —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM, where M representing a counter ion. The hydrophilic group may be introduced to the pigment by any known method.

Preferably, the counter ion M is a quaternary ammonium ion. Specific examples of the quaternary ammonium ion include, but are not limited to, tetramethylammonium ion, tetraethylammonium ion, tetrapropylammonium ion, tetrabutylammonium ion, tetrapentylammonium ion, benzyltrimethylammonium ion, benzyltriethylammonium ion, and tetrahexylammonium ion. Among these, tetraethylammonium ion, tetrabutylammonium ion, and benzyltrimethylammonium ion are preferable, and tetrabutylammonium ion is more preferable.

The ink containing the above pigment has particularly high temporal storage stability and is suppressed from causing a viscosity increase at the time of evaporation of moisture. A reason for this is considered that, even when the ink has transited from a water-rich state to an organic-solvent-rich state by evaporation of moisture, the hydrophilic group containing a quaternary ammonium ion can keep pigment dispersion stable.

Specific preferred examples of the colorant other than the pigments having hydrophilic group include emulsions of fine polymer particles containing a pigment. The pigment particles may be either encapsulated in the fine polymer particles or adsorbed to the surfaces of the fine polymer particles. Not all the pigment particles need to be encapsulated in and/or adsorbed to the fine polymer particles and a part of the pigment particles can be solely dispersed in the emulsion. Examples of the polymer used for the fine polymer particles include, but are not limited to, vinyl polymers, polyester polymers, and polyurethane polymers. Among these polymers, vinyl polymers and polyester polymers are preferable. Specific examples of such polymers include those disclosed in JP-2000-53897-A and JP-2001-139849-A.

Additionally, typical organic pigments and composite pigments in which inorganic pigment particles are coated with an organic pigment or carbon black (i.e., colorant) are usable. Such a composite pigment may be prepared by a method that deposits an organic pigment in the presence of inorganic pigment particles or a mechanochemical method that mechanically mixes and grinds an inorganic pigment and an organic pigment. To improve adhesion between the inorganic pigment and the organic pigment, an organosilane compound layer may be formed therebetween from a polysiloxane and an alkylsilane.

In the composite pigment, the mass ratio of the inorganic pigment particles to the colorant (i.e., an organic pigment or carbon black) is preferably from 3/1 to 1/3, and more preferably from 3/2 to 1/2. When the amount of the colorant is too small, color developing property and coloring power may deteriorate. When the amount of the colorant is too large, transparency and color tone may deteriorate.

Specific preferred examples of the composite pigments include, but are not limited to, silica/carbon black composite pigments, silica/phthalocyanine PB 15:3 composite pigments, silica/disazo yellow composite pigments, silica/quinacridone PR 122 composite pigments available from TODA KOGYO CORP., the primary average particle diameter of which are small.

In a case in which inorganic pigment particles having a primary particle diameter of 20 nm are coated with the equivalent amount of an organic pigment, the primary particle diameter becomes about 25 nm. If primary particles of the coated inorganic pigment particles can be dispersed with an appropriate dispersant, a pigment ink will be obtained in which very fine particles of the pigment having a dispersion diameter of 25 nm are dispersed. In the composite pigment, not only the organic pigment present on its surface contribute to dispersion but also the property of the inorganic pigment exhibits through the thin organic pigment layer having a thickness of about 2.5 nm. Therefore, a pigment dispersant which can stably disperse both the organic and inorganic pigments is preferably used.

Specific examples of the inorganic pigments include, but are not limited to, titanium oxide, iron oxide, calcium carbonate, barium sulfate, aluminum hydroxide, barium yellow, cadmium red, chrome yellow, and carbon black. Among these inorganic pigments, carbon black is preferable. Specific examples of carbon black include, but are not limited to, channel black, furnace black, gas black, and lamp black, which may be produced by a known method, such as a contact method, furnace method, and thermal method.

Specific examples of the organic pigments include, but are not limited to, azo pigments, polycyclic pigments, dye chelates, nitro pigments, nitroso pigments, and aniline black. Among these organic pigments, azo pigments and polycyclic pigments are preferable. Specific examples of the azo pigments include, but are not limited to, azo lakes, insoluble azo pigments, condensed azo pigments, and chelate azo pigments. Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments. Specific examples of the dye chelates include, but are not limited to, basic dye chelates and acid dye chelates.

Specific examples of the organic pigments further include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 155, 153, 180, 183, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, and 219; C.I. Pigment Violet 1 (rhodamine lake), 3, 5:1, 16, 19, 23, and 38; C.I. Pigment Blue 1, 2, 15 (phthalocyanine blue), 15:1, 15:2, 15:3 (phthalocyanine blue), 16, 17:1, 56, 60, and 63; and C.I. Pigment Green 1, 4, 7, 8, 10, 17, 18, and 36.

Preferably, the pigment has a BET specific surface area of about 10 to 1,500 $m^2/g$, more preferably about 20 to 600 $m^2/g$, and most preferably about 50 to 300 $m^2/g$.

In a case in which pigments having a BET specific surface area within the above range are not readily available, a typical size reduction or pulverization treatment, such as ball mill pulverization, jet mill pulverization, and ultrasonic treatment, may be performed to obtain pigment particles having a relatively small particle diameter.

Preferably, the water-dispersible colorants have a volume average particle diameter ($D_{50}$) of from 10 to 200 nm in the ink.

The content rate of the water-dispersible colorant in the ink is preferably from 1% to 15% by mass, more preferably from 2% to 10% by mass, based on solid contents. When the content rate is 1% by mass or more, color developing power of the ink and image density of the ink image improve. When the content rate is 15% by mass or less, it is prevented that the ink thickens to degrade dischargeability, which is preferred in terms of cost.

The ink may further include a dye in combination with a pigment for the purpose of adjusting color tone so long as fade resistance is not degraded.

Wax

The ink may further contain a wax. Preferably, the mass ratio (x/w) of the organic solvent X to the wax in the ink is in the range of from 30 to 500.

By containing a wax in the ink, the problem of image defect, caused upon image transfer or abrasion due to poor drying property and fixability of the ink, can be solved, because the wax can be scattered over the surface of the printed image to lubricate the surface and improve abrasion resistance of the image. On the other hand, because the wax has strong hydrophobicity, storage stability and dischargeability of the ink may deteriorate when the ink has strong hydrophilicity. In view of this, JP-2016-145313-A discloses an ink containing a wax and a solvent having a solubility parameter of from 9.0 to 11.0, where the mass ratio of the wax to the solvent being in the range of from 1/2.5 to 1/25.0. If this ink is used in a circulation-type head in accordance with some embodiments of the present invention, pigment dispersion may be destroyed within a negative pressure tank by the effect of hydrophobicity of not only the solvent but also the wax. To avoid such a problem, in accordance with some embodiments of the present invention, the content of wax in the ink may be preferably reduced without degrading image fixability. Specifically, the mass ratio (x/w) of the organic solvent X having a solubility parameter of from 8.9 to 12.0 to the wax in the ink is preferably in the range of from 30 to 500.

The wax may be either water-soluble or water-dispersible. Examples of water-soluble waxes include waxes having a hydrophilic group such as hydroxyl group, carboxyl group, ethylene oxide group, and amine group. Water-dispersible waxes can be used in the form of wax emulsions.

Specific examples of the wax include, but are not limited to, plant or animal waxes such as carnauba wax, candelilla wax, bees wax, rice wax, and lanoline; petroleum waxes such as paraffin wax, micro-crystalline wax, polyethylene wax, polypropylene wax, oxidized polyethylene wax, and petrolatum; mineral waxes such as montan wax and ozokerite; synthetic waxes such as carbon wax, Hoechst wax, polyethylene wax, and stearic acid amide; emulsions of natural or synthetic waxes such as α-olein/maleic anhydride copolymers; and blend waxes. Each of these waxes can be used alone or in combination with others. Additionally, latexes, colloid solutions, and suspension liquids are also usable. Among these waxes, polyethylene waxes are preferable that have excellent solubility and dispersibility in water-soluble solvents.

Specific examples of commercially-available waxes include, but are not limited to, SELOSOL 524 (carnauba wax having a melting point of 83° C. and a particle diameter of 200 nm, available from Chukyo Yushi Co., Ltd.), HYTEC E-6500 (polyethylene wax having a melting point of 140° C. and a particle diameter of 60 nm, available from Toho Chemical Industry Co., Ltd.), HYTEC E-8237 (polyethylene was having a melting point of 106° C. and a particle diameter of 80 nm, available from Toho Chemical Industry Co., Ltd.), HYTEC P-9018 (polypropylene wax having a melting point of 156° C. and a particle diameter of 60 nm, available from Toho Chemical Industry Co., Ltd.), NOP-COTE PEM-17 (polyolefin wax having a melting point of 105° C. and a particle diameter of 10 nm, available from San Nopco Limited), AQUACER 498 (paraffin wax having a melting point of 58° C., available from BYK Japan KK), AQUACER 535 (mixture wax having a melting point of 95° C., available from BYK Japan KK), AQUACER 531 (polyethylene wax having a melting point of 130° C. and a particle diameter of 123 nm, available from BYK Japan KK), and AQUACER 515 (polyethylene wax having a melting point of 135° C. and a particle diameter of 33 nm, available from BYK Japan KK).

Preferably, the wax has a melting point of from 70° C. to 170° C., more preferably from 100° C. to 140° C. When the melting point is 70° C. or more, the image is less sticky and image transfer does not occur even when the images are stacked on one another. When the melting point is 170° C. or less, the image melts by frictional heat when rubbed and becomes slippery, thus improving abrasion resistance.

Preferably, the wax has a volume average particle diameter of 200 nm or less, more preferably from 20 to 150 nm. When the volume average particle diameter is 200 nm or less, the ink can be stably discharged without clogging the nozzle or filter in the head.

The content rate of the wax in the ink is preferably in the range of from 0.05% to 2% by mass, more preferably from 0.1% to 0.5% by mass, based on solid contents. When the content rate is 0.05% by mass or more, the surface of the printed image is lubricated and abrasion resistance of the image is kept high. When the content rate is 2% by mass or less, the wax can be dissolved or dispersed in the solvent of the ink without being deposited on the head. Thus, ink droplets can be reliably discharged.

Preferably, the mass ratio (x/w) of the organic solvent X to the wax in the ink is in the range of from 30 to 500. Within the above range, wax particles are surrounded by an adequate amount of the solvent, thereby imparting good storage stability and discharge stability to the ink.

When the mass ratio (x/w) is less than 30, storage stability of the ink may deteriorate. As a result, the wax may be deposited at nozzle openings to cause defective discharge. When the mass ratio (x/w) is in excess of 500, the wax dispersed in the ink may be dissolved in the solvent. As a result, the viscosity of the ink may increase to cause defective discharge and storage stability may deteriorate.

Polyether-Modified Siloxane Compound

The ink may further contain a polyether-modified siloxane compound as a surfactant. By containing a polyether-modified siloxane compound, the ink becomes less wettable to an ink-repellent layer of the head nozzle plate, thus preventing the ink from adhering to the nozzle. As a result, defective discharge is prevented and discharge stability is improved. In addition, the ink becomes less adhesive to an ink-repellent layer of the nozzle and the problem of defective discharge is less likely to be caused.

In particular, the following compounds represented by respective formulae (6) to (9) are preferable, which are capable of maintaining dispersion stability regardless of the type of water-dispersible colorant or organic solvent used in combination, while having a low dynamic surface tension and high permeability and leveling property.

Each of the following polyether-modified siloxane compounds can be used alone or in combination with others.

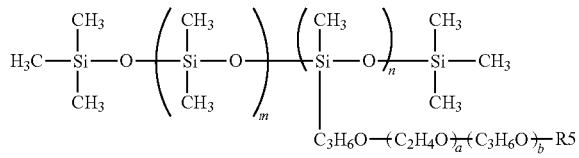

Formula (6)

In the formula (6), R5 represents a hydrogen atom or alkyl group having 1 to 4 carbon atoms, m represents an integer of from 0 to 23, n represents an integer of from 1 to 10, a represents an integer of from 1 to 23, and b represents an integer of from 0 to 23.

Specific examples of the compound represented by the formula (6) include the following compounds represented by respective formulae (6-1) to (6-8).

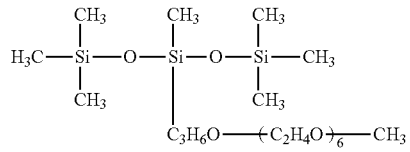

Formula (6-1)

-continued

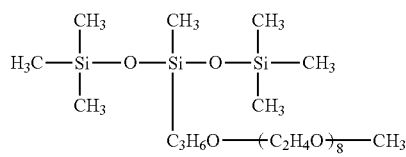

Formula (6-2)

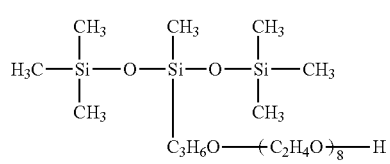

Formula (6-3)

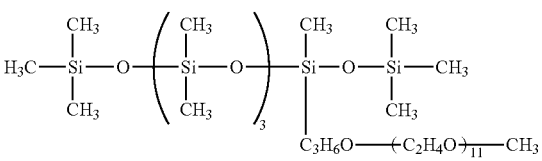

Formula (6-4)

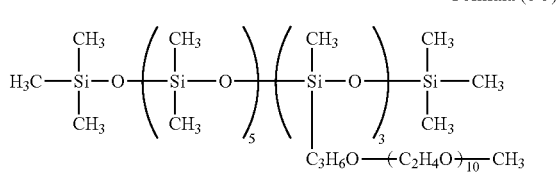

Formula (6-5)

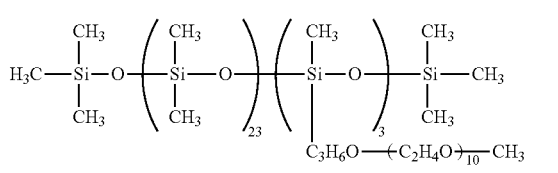

Formula (6-6)

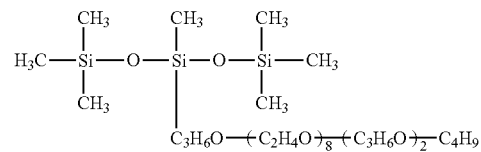

Formula (6-7)

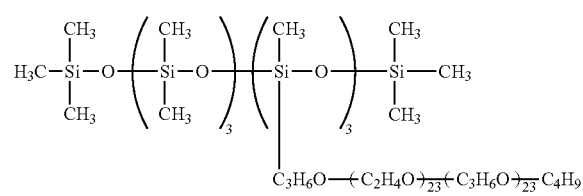

Formula (6-8)

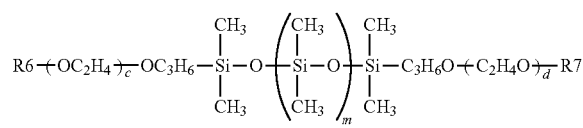

Formula (7)

In the formula (7), each of R6 and R7 independently represents a hydrogen atom or alkyl group having 1 to 4 carbon atoms, m represents an integer of from 1 to 8, and each of c and d independently represents an integer of from 1 to 10.

Specific examples of the compound represented by the formula (7) include the following compounds represented by a formula (7-1).

Formula (7-1)

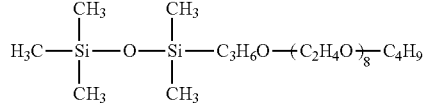

Formula (8)

$$H_3C-\underset{\underset{CH_3}{|}}{\overset{\overset{CH_3}{|}}{Si}}-O-\underset{\underset{CH_3}{|}}{\overset{\overset{CH_3}{|}}{Si}}-C_3H_6O{\text{\textemdash}}(C_2H_4O)_e{\text{\textemdash}}R8$$

In the formula (8), R8 represents a hydrogen atom or alkyl group having 1 to 4 carbon atoms and e represents an integer of from 1 to 8.

Specific examples of the compound represented by the formula (8) include the following compound represented by a formula (8-1).

Formula (8-1)

$$H_3C-\underset{\underset{CH_3}{|}}{\overset{\overset{CH_3}{|}}{Si}}-O-\underset{\underset{CH_3}{|}}{\overset{\overset{CH_3}{|}}{Si}}-C_3H_6O{\text{\textemdash}}(C_2H_4O)_8{\text{\textemdash}}C_4H_9$$

Formula (9)

$$H_3C-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{(CH_2)_f}{|}\atop{R9}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-CH_3$$

In the formula (9), R9 represents a polyether group represented by the following formula (A) and f represents an integer of from 1 to 8.

$${\text{\textemdash}}(C_3H_6O)_g{\text{\textemdash}}(C_2H_4O)_h{\text{\textemdash}}R10$$

Formula (A)

In the formula (A), R10 represents a hydrogen atom or alkyl group having 1 to 4 carbon atoms, g represents an integer of from 0 to 23, and h represents an integer of from 0 to 23, where both of g and h never representing 0 at the same time.

Specific examples of the compound represented by the formula (9) include the following compounds represented by respective formulae (9-1) to (9-3).

Formula (9-1)

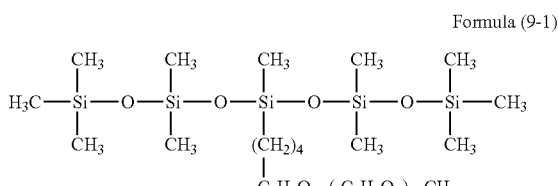

Formula (9-2)

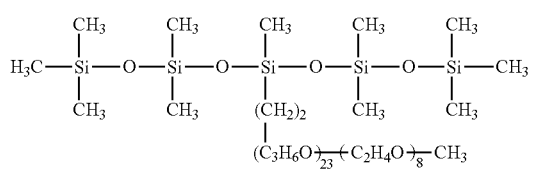

Formula (9-3)

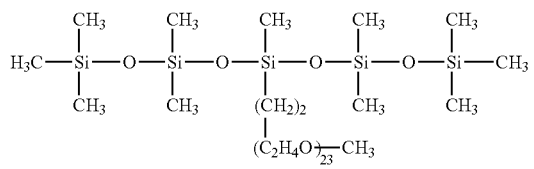

Specific examples of commercially-available products of polyether-modified siloxane compound surfactants having the same effect as the above compounds include, but are not limited to, 71 ADDITIVE, 74 ADDITIVE, 57 ADDITIVE, 8029 ADDITIVE, 8054 ADDITIVE, 8211 ADDITIVE, 8019 ADDITIVE, 8526 ADDITIVE, FZ-2123, and FZ-2191 (available from Dow Corning Toray Co., Ltd.); TSF4440, TSF4441, TSF4445, TSF4446, TSF4450, TSF4452, and TSF4460 (available from Momentive Performance Materials Inc.); SILFACE SAG002 SILFACE SAG003, SILFACE SAG005, SILFACE SAG503A, SILFACE SAG008, and SILFACE SJM003 (available from Nissin Chemical Industry Co., Ltd.); TEGO Wet KL245, TEGO Wet 250, TEGO Wet 260, TEGO Wet 265, TEGO Wet 270, and TEGO Wet 280 (available from Evonik Japan Co, Ltd.); and BYK-345, BYK-347, BYK-348, BYK-375, and BYK-377 (available from BYK Japan KK).

The polyether-modified siloxane compound may be used in combination with a fluorine-based surfactant, a silicone-based surfactant, acetylene glycol, or an acetylene-alcohol-based surfactant.

The content rate of the polyether-modified siloxane compound in the ink is preferably in the range of from 0.001% to 5% by mass, more preferably from 0.5% to 3% by mass. When the content rate is 0.001% by mass or more, the addition effect of surfactant is exerted. However, the addition effect is saturated above the content rate of 5% by mass.

Other Components

The ink may further contain various additives other than the above-described components. Examples of such additives include penetrant, foam inhibitor (defoamer), water-dispersible resin, pH adjuster, preservative and fungicide, chelate agent, corrosion inhibitor, antioxidant, ultraviolet absorber, oxygen absorber, and photostabilizer.

Foam Inhibitor

The ink may contain a foam inhibitor in a slight amount for suppressing bubble formation. Here, the bubble formation refers to a phenomenon in which a liquid becomes a thin film and encloses the air. Whether bubble formation occurs or not depends on the properties of ink, such as surface tension and viscosity. For example, a liquid having a high surface tension, such as water, is unlikely to cause bubble formation because a force for minimizing the surface area of the liquid generates in the liquid. On the other hand, a highly-viscous and highly-permeable ink is likely to cause bubble formation due to its low surface tension. The generated bubbles are likely to maintain due to the high viscosity of the ink.

The foam inhibitor is of two types: those destroy bubbles by locally reducing the surface tension of the bubble film; and those insoluble in a bubbled liquid that destroy bubbles by being scattered on the surface of the bubbled liquid. When the polyether-modified siloxane compound, having a very strong function of reducing surface tension, is contained in ink as a surfactant, the foam inhibitor of the former type cannot locally reduce the surface tension of the bubble film. Therefore, in this case, the foam inhibitor of the latter type that is insoluble in a bubbled liquid is used while degrading the stability of ink.

On the other hand, a foam inhibitor represented by the following formula (10) has high compatibility with the polyether-modified siloxane compound surfactant, although the function of reducing surface tension is not as strong as that of the polyether-modified siloxane compound surfactant. Such a foam inhibitor can be effectively incorporated into the bubble film. Due to the difference in surface tension between the surfactant and the foam inhibitor, the surface of the bubble film becomes locally imbalanced and the bubbles are destroyed.

Formula (10)

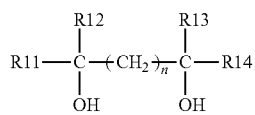

In the formula (10), each of $R_{11}$ and $R_{14}$ independently represents an alkyl group having 3 to 6 carbon atoms, each of $R_{12}$ and $R_{13}$ independently represents an alkyl group having 1 to 2 carbon atoms, and n represents an integer of from 1 to 6.

Specific preferred examples of the compound represented by the formula (10) include, but are not limited to, 2,4,7,9-tetramethyldecane-4,7-diol and 2,5,8,11-tetramethyldodecane-5,8-diol. In particular, 2,5,8,11-tetramethyldodecane-5,8-diol is more preferred for its high foam inhibiting effect and compatibility with the ink.

The content of the foam inhibitor in the ink is preferably in the range of from 0.01% to 10% by mass, more preferably from 0.1% to 5% by mass. When the content is 0.01% by mass or more, foam inhibiting effect is exerted. When the content is 10% by mass or less, it is prevented that foam inhibiting effect levels off and the ink properties such as viscosity and particle diameter are adversely affected.

Water-Dispersible Resin

As the water-dispersible resin, resins having excellent film-forming property (i.e., image forming property), high water-repellent property, high water resistance, and high fade resistance are advantageous for recording images having high waterfastness and high image density (i.e., color developing property). Examples of such resins include condensation-type synthetic resins, addition-type synthetic resins, and natural polymers.

Specific examples of the condensation-type synthetic resins include, but are not limited to, polyester resin, polyurethane resin, polyepoxy resin, polyamide resin, polyether resin, polyacrylic or polymethacrylic resin, acrylic-silicone resin, and fluorine-based resin. Specific examples of the addition-type synthetic resins include, but are not limited to, polyolefin resin, polystyrene resin, polyvinyl alcohol resin, polyvinyl ester resin, polyacrylic acid resin, and unsaturated carboxylic acid resin. Specific examples of the natural polymers include, but are not limited to, celluloses, rosins, and natural rubbers.

Among these materials, acrylic-silicone resin and fluorine-base resin in the form of fine particles are preferable. Each of these resins can be used alone or in combination with others.

Either a self-dispersible resin having a hydrophilic group and a-non-self-dispersible resin to which dispersibility has been imparted by a surfactant or a resin having a hydrophilic group can be used as the water-dispersible resin in the present disclosure. In particular, an emulsion of resin particles obtained by emulsion polymerization or suspension polymerization of ionomers or unsaturated monomers of polyester or polyurethane resin is preferably used as the water-dispersible resin.

In a case in which a resin emulsion is obtained by emulsion polymerization of unsaturated monomers, the unsaturated monomers are reacted in water containing a polymerization initiator, a surfactant, a chain transfer agent, a chelate agent, a pH adjuster, etc. This is an easy way of obtaining the water-dispersible resin and varying the resin composition in accordance with use purpose.

In the water-dispersible resin, molecular chain cleavage phenomena, such as dispersion destruction and hydrolysis, may be caused under a strongly basic or acidic environment. Therefore, the water-dispersible resin in the form of a resin particle dispersion, obtained by being dispersed in water before being added to the ink, preferably has a pH of from 4 to 12. For more improving miscibility with the water-dispersible colorant, the pH is preferably from 6 to 11 and more preferably from 7 to 10.

The average particle diameter ($D_{50}$) of the water-dispersible resin correlates with the viscosity of the dispersion liquid. The particle diameter becomes smaller as the viscosity (under the some solid content) becomes larger under the same composition. Preferably, the average particle diameter ($D_{50}$) of the water-dispersible resin is at least 50 nm, so as not to excessively increase the viscosity of the ink. In a case in which the particle diameter of the resin particles is several tens of micrometers, the ink cannot be used because the resin particles are larger than nozzle openings of an inkjet head. Even being smaller than nozzle openings, large resin particles present in the ink will degrade dischargeability of the ink. Accordingly, preferably, the average particle diameter ($D_{50}$) of the water-dispersible resin is 200 nm at most, more preferably 150 nm at most, so as not to degrade ink dischargeability.

The water-dispersible resin has a function of fixing the water-dispersible colorant on the surface of a recording medium and another function of improving fixability of the colorant by being formed into a film at room temperature. Therefore, the water-dispersible resin preferably has a minimum film-forming temperature (MFT) of 30° C. or less. In addition, the water-dispersible resin preferably has a glass transition temperature of −30° C. or more. This is because, when the water-dispersible resin has a glass transition temperature of −40° C. or less, the resulting film becomes so viscid that tackiness is given to the print.

The content rate of the water-dispersible resin in the ink is preferably in the range of from 0.5% to 10% by mass, more preferably from 1% to 8% by mass, based on solid contents.

pH Adjuster

The pH adjuster is not limited to a specific material so long as it can adjust the pH of the ink to 7 to 11 without adversely affecting the ink.

Specific examples of the pH adjuster include, but are not limited to, alcohol amines, alkali metal hydroxides, ammonium hydroxides, phosphonium hydroxides, and alkali metal carbonates.

When the pH is less than 7 or in excess of 11, inkjet heads and/or ink supply units may be dissolved out in large amounts, thereby causing alternation, leakage, and defective discharge of the ink.

Specific examples of the alcohol amines include, but are not limited to, diethanolamine, triethanolamine, and 2-amino-2-ethyl-1,3-propanediol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide and quaternary ammonium hydroxide.

Specific examples of the phosphonium hydroxides include, but are not limited to, quaternary phosphonium hydroxide.

Specific examples of the alkali metal carbonates include, but are not limited to, lithium carbonate, sodium carbonate, and potassium carbonate.

Preservative and Fungicide

Specific examples of the preservative and fungicide include, but are not limited to, sodium dehydroacetate, sodium sorbate, 2-pyridinethiol-1-oxide sodium salt, sodium benzoate, and pentachlorophenol sodium.

Chelate Agent

Specific examples of the chelate agent include, but are not limited to, ethylenediaminetetraacetic acid sodium salt, nitrilotriacetic acid sodium salt, hydroxyethylethylenediaminetriacetic acid sodium salt, diethylenetriaminepentaacetic acid sodium salt, and uramildiacetic acid sodium salt.

Corrosion Inhibitor

Specific examples of the corrosion inhibitor include, but are not limited to, acid sulphite, sodium thiosulfate, ammonium thiodiglycolate, diisopropylammonium nitrite, pentaerythritol tetranitrate, and dicyclohexlyammonium nitrite.

Antioxidant

Specific examples of the antioxidant include, but are not limited to, phenol-based antioxidants (including hindered-phenol-based antioxidants), amine-based antioxidants, sulfur-based antioxidants, and phosphor-based antioxidants.

Ultraviolet Absorber

Specific examples of the ultraviolet absorber include, but are not limited to, benzophenone-based ultraviolet absorbers, benzotriazole-based ultraviolet absorbers, salicylate-based ultraviolet absorbers, cyanoacrylate-based ultraviolet absorbers, and nickel-complex-salt-based ultraviolet absorbers.

Ink Manufacturing Method

In accordance with some embodiments of the present invention, the ink may be manufactured by dispersing or dissolving the colorant, the organic solvent X, water, the copolymer, and optional components, if any, in an aqueous medium, optionally while stirring and mixing them. The stirring and mixing may be performed by a sand mill, homogenizer, ball mill, paint shaker, ultrasonic disperser, stirrer equipped with stirring blades, magnetic stirrer, or high-speed disperser.

The copolymer having a structural unit represented by the formula (1) may be added to the aqueous medium as a dispersant for dispersing the colorant. Alternatively, a water dispersion of the copolymer may be added to the ink as a water-dispersible resin.

Ink Properties

Properties of the ink have no specific limit and can be suitably selected to suit to a particular application.

Preferably, the ink has a static surface tension of 20 mN/m and a dynamic surface tension of 34 mN/m or less, where the dynamic surface tension being measured by a maximum bubble pressure method when a bubble lifetime is 15 msec. In this case, the ink becomes less wettable to a water-repellent film of a nozzle plate of an inkjet head without degrading wettability to recoding media, thus securing discharge stability.

In addition, preferably, the ink has a viscosity of from 5 to 25 mPa·s, more preferably from 6 to 20 mPa·s, at 25° C. When the ink viscosity is 5 mPa·s or more, print density and text quality are improved. When the ink viscosity is 25 mPa·s is less, ink dischargeability is secured.

The viscosity can be measured by a viscometer (e.g., RE-550L available from Toki Sangyo Co., Ltd.) at 25° C.

The ink discharge device in accordance with some embodiments of the present invention may include an inkjet head of any of the following types: a piezo-type inkjet head in which a piezoelectric element, serving as a pressure generator for pressurizing ink in an ink flow channel, deforms a vibration plate that forms a wall surface of the ink flow channel to vary the inner volume of the ink flow channel to discharge droplets of the ink (as described in JP-02-51734-B corresponding to JP-56-064877-A); a thermal-type inkjet head in which a heat element heats ink in an ink flow channel to generate bubbles (as described in JP-61-59911-B corresponding to JP-54-059936-A); and an electrostatic-type inkjet head in which a vibration plate that forms a wall surface of an ink flow channel and an electrode are facing each other and an electrostatic force generated between the vibration plate and the electrode deforms the vibration plate to vary the inner volume of the ink flow channel to discharge droplets of the ink (as described in JP-06-71882-A).

The ink may be stored in an ink storage container such as an ink cartridge.

Recording Medium

The ink discharge device in accordance with some embodiments of the present invention is capable of recording information on a recording medium. Specific examples of the recording medium include, but are not limited to, plain paper, glossy paper, special paper, clothes, film, overhead projector (OHP) transparency, and general-purpose printing paper. The ink discharge device in accordance with some embodiments of the present invention is also capable of recording information on commercial printing paper in the same manner as on the other papers, which is very advantageous.

Here, the commercial printing paper refers to a printing paper having a coated layer on at least one surface of a substrate. The coated layer may comprise a filler such as calcium carbonate and kaolin. More specifically, the coated layer of the commercial printing paper may comprise a white pigment, such as clay (kaolin) and calcium carbonate, and an adhesive (binder) such as starch.

A recorded matter including an image formed by the ink discharge device in accordance with some embodiments of the present invention has high image quality without blurring and excellent temporal stability. The recorded matter can be used for various purposes such as a material on which texts and/or images are recorded.

In particular, recording media having a specific liquid absorptivity are preferable, for providing high image quality (in terms of image density, color saturation, beading, and color bleeding), high gloss, and excellent fixability (in terms of smear). Specifically, commercial printing papers, having a coated layer on at least one surface of a substrate, which have the following property are preferable: the transfer amount of pure water to the printing paper via the coated layer within contact time periods of 100 ms and 400 ms ranges from 2 to 35 mL/m$^2$ and from 3 to 40 mL/m$^2$, respectively, when measured by a dynamic scanning liquid absorptiometer. When the transfer amount of pure water is too small, beading (i.e., a phenomenon in which adjacent dots attract each other to make the image surface rough) and color bleeding (i.e., blurring caused between different colors) may easily occur. When the transfer amount of pure water is too large, the ink dot diameter in the image becomes too small to fill a solid image.

The transfer amount of pure water may be measured by a dynamic scanning liquid absorptiometer (K350 series D type available from Kyowa Co., Ltd.). The transfer amount within a contact time period of 100 ms is determined by interpolating the transfer amounts measured within contact time periods near 100 ms.

Specific examples of commercially-available printing papers having liquid absorptivity as specified above include, but are not limited to, POD GLOSS COAT, OK TOP COAT+, OK KINFUJI+, and SA KINFUJI+(available from Oji Paper Co., Ltd.), SUPER MI DULL, AURORA COAT, and SPACE DX (available from Nippon Paper Industries Co., Ltd.), at MATT and COAT (available from Hokuetsu Kishu Paper Co., Ltd.), RAICHO ART and RAICHO SUPER ART (available from Chuetsu Pulp & Paper Co., Ltd.), and PEARL COAT N (available from Mitsubishi Paper Mills Limited).

Ink Discharge Device and Ink Discharge Method

The ink discharge device in accordance with some embodiments of the present invention can be suitably applied to various recording devices employing an inkjet recording method, such as printers, facsimile machines, photocopiers, multifunction peripherals (having the functions of printer, facsimile machine, and photocopier), and three-dimensional object manufacturing devices.

In the present disclosure, the ink discharge device and the ink discharge method respectively represent a device capable of discharging inks or various treatment liquids to a recording medium and a method for recording using the device. The recording medium refers to an article to which the inks or various treatment liquids can be attached at least temporarily.

The ink discharge device in accordance with some embodiments of the present invention includes the ink and an ink discharge head. The ink discharge head includes a nozzle configured to discharge the ink, a plurality of individual liquid chambers in communication with the nozzle, a flow-in channel configured to let the ink flow into the individual liquid chambers, and a flow-out channel configured to let the ink flow out from the individual liquid chambers. The ink discharge device further includes a negative pressure generator configured to generate a negative pressure that lets the ink flow out from the individual liquid chambers. The inkjet head is a circulation-type discharge head configured to let the ink having flowed out from the flow-out channel flow into the flow-in channel to circulate the ink.

The ink discharge method in accordance with some embodiments of the present invention includes the processes of: letting an ink flow into multiple individual liquid chambers in communication with a nozzle via a flow-in channel; letting the ink flow out from the multiple individual liquid chambers via a flow-out channel; generating a negative pressure that lets the ink flow out from the individual liquid chambers; and letting the ink having flowed out from the flow-out channel flow into the flow-in channel to circulate the ink.

The ink discharge device may further optionally include devices relating to feeding, conveying, and ejecting of the recording medium and other devices referred to as a pre-treatment device or an aftertreatment device, in addition to the ink discharger.

The ink discharge device may further optionally include a heater for use in a heating process and a drier for use in a drying process. Examples of the heater and the drier include devices for heating and drying the printed surface and the reverse surface of a recording medium. Specific examples of the heater and the drier include, but are not limited to, a fan heater and an infrared heater. The heating process and the drying process may be performed either before, during, or after printing.

In addition, the ink discharge device and the ink discharge method are not limited to those producing merely meaningful visible images such as texts and figures with the ink. For example, the ink discharge device and the ink discharge method can produce patterns like geometric design and three-dimensional images.

The ink discharge device includes both a serial-type device in which the discharge head is movable and a line-type device in which the discharge head is unmovable. The discharge head is a circulation-type discharge head configured to circulate ink within multiple individual liquid chambers. The circulation-type discharge head is described in detail later.

Furthermore, in addition to the desktop type, the ink discharge device includes a device capable of printing images on a large recording medium with A0 size and a continuous printer capable of using continuous paper reeled up in a roll form as recording media.

Figure 2:
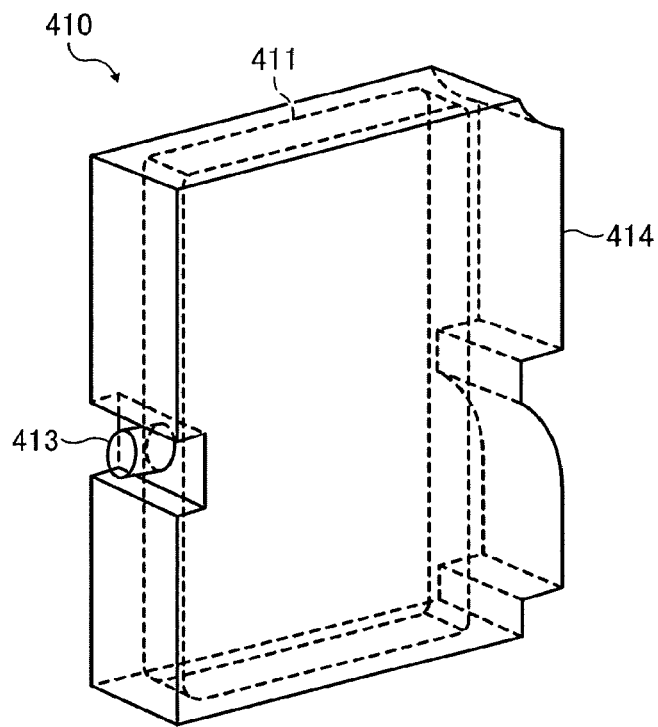
FIG. 2 is a schematic perspective view of an ink storage container in accordance with some embodiments of the present invention.

As one example of the ink discharge device, an image forming apparatus 400 is described in detail below with reference to FIGS. 1 and 2. FIG. 1 is a perspective view of an image forming apparatus 400. FIG. 2 is a perspective view of a main tank for storing an ink.

The image forming apparatus 400 is a serial-type image forming apparatus. A mechanical unit 420 is disposed in a housing 401 of the image forming apparatus 400. Main tanks 410k, 410c, 410m, and 410y for respective color of black (K), cyan (C), magenta (M), and yellow (Y) (hereinafter collectively referred to as "main tank 410") each include an ink container 411. Each ink container 411 is made of a packaging member such as an aluminum laminate film. The ink container 411 is accommodated in a container casing 414 made of plastic.

As a result, the main tank 410 is used as an ink cartridge of each color.

A cartridge holder 404 is disposed on the rear side of the opening when a cover 401c is opened. The main tank 410 is detachably attachable to the cartridge holder 404. As a result, each ink discharging outlet 413 of the main tank 410 communicates with a discharge head 434 for each color via a supplying tube 436 for each color so that the ink can be discharged from the discharge head 434 to a recording medium.

Figure 3:
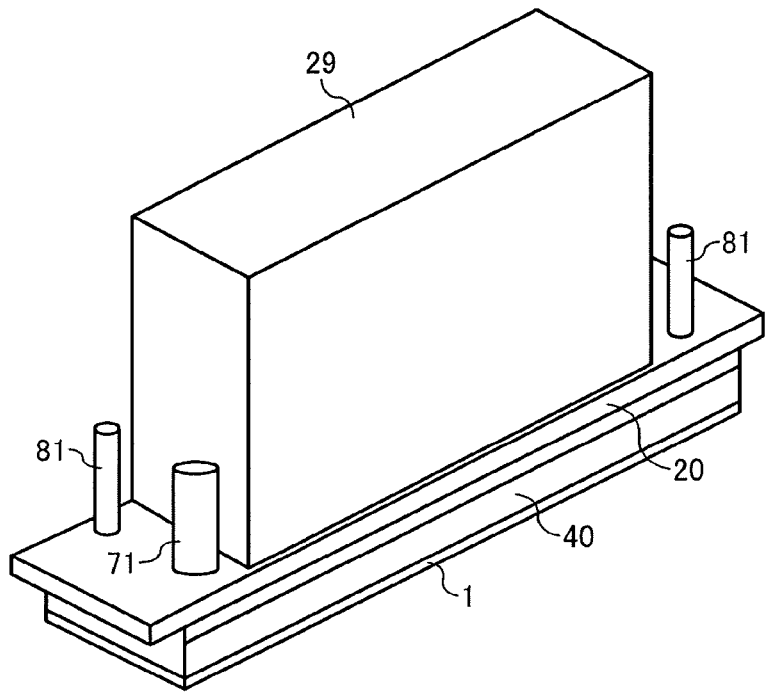
FIG. 3 is a schematic perspective view of an outline of an ink discharge head in accordance with some embodiments of the present invention.
Figure 4:
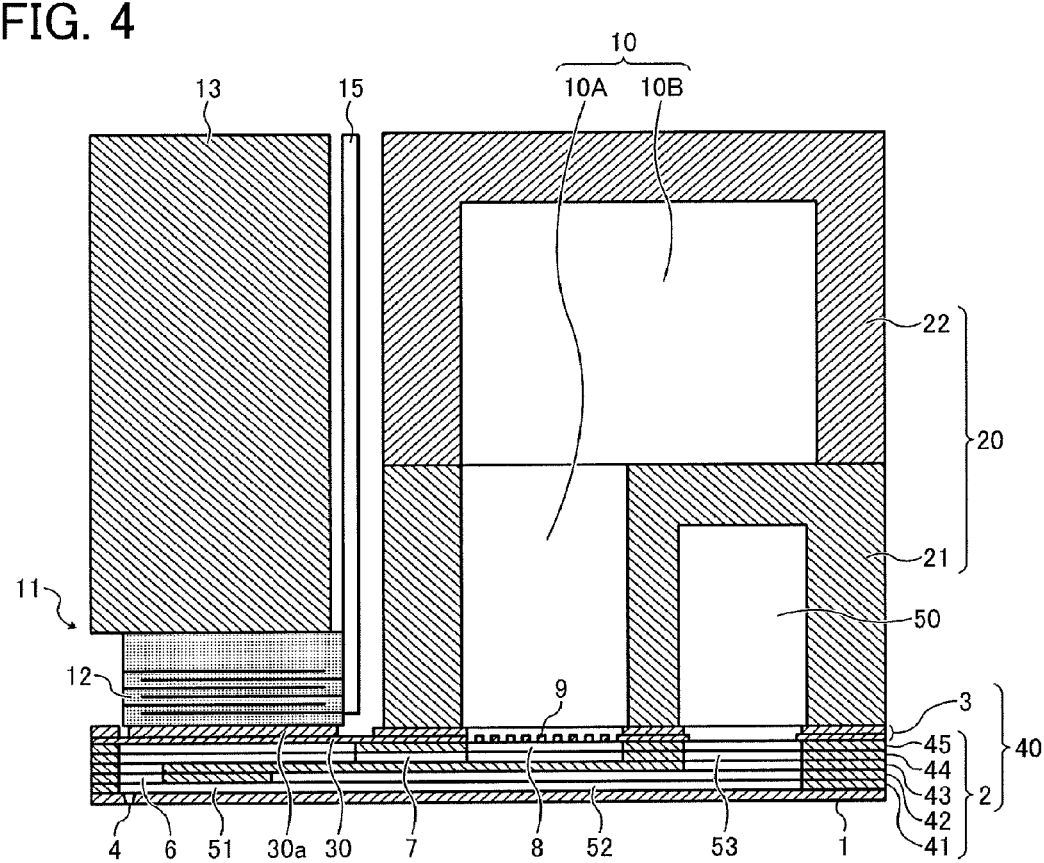
FIG. 4 is a cross-sectional view of the head illustrated in FIG. 3 in a direction perpendicular to the nozzle array direction.
Figure 5:
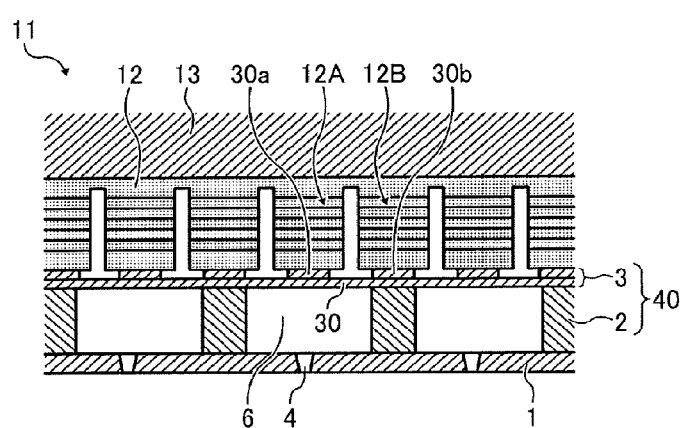
FIG. 5 is a cross-sectional view of the head illustrated in FIG. 3 in a direction parallel to the nozzle array direction.
Figure 6:
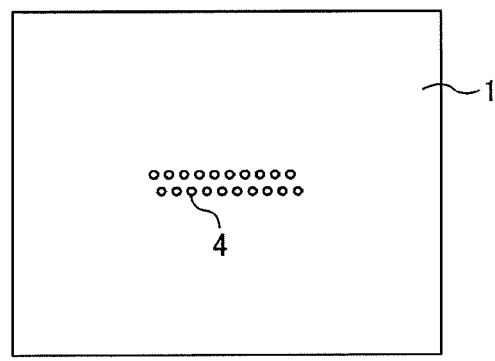
FIG. 6 is a plan view of a nozzle plate of the head illustrated in FIG. 3.

Ink Discharge Device Having Circulation-Type Discharge Head and Ink Discharge Method One example of the circulation-type discharge head is described below with reference to FIGS. 3 to 8. FIG. 3 is an outline perspective view of the circulation-type discharge head (hereinafter simply "head"). FIG. 4 is a cross-sectional view of the head in a direction perpendicular to the nozzle array direction. FIG. 5 is a cross-sectional view of the head in a direction parallel to the nozzle array direction. FIG. 6 is a plan view of a nozzle plate of the head. FIGS. 7A to 7F are plan views of members constituting a channel substrate of the head. FIGS. 8A and 8B are plan views of members constituting a common liquid chamber substrate of the head.

In the head, a nozzle plate 1, a channel plate 2, and a diaphragm 3 as a wall member are attached to and laminated on each other. The head further includes a piezoelectric actuator 11 that displaces the diaphragm 3, a common liquid chamber substrate 20, and a cover 29.

The nozzle plate 1 includes multiple nozzles 4 that discharge the ink.

The channel plate 2 forms an individual liquid chamber 6 in communication with the nozzle 4, a fluid resistance part 7 in communication with the individual liquid chamber 6, and a liquid introduction part 8 in communication with the fluid resistance part 7. The channel plate 2 is formed of multiple plate-like members 41 to 45 attached to each other in a lamination manner on the nozzle plate 1. The plate-like members 41 to 45 and the diaphragm 3 are attached to and laminated on each other to form a channel substrate 40.

The diaphragm 3 includes a filter part 9 serving as an opening in communication with a common liquid chamber 10 formed of the liquid introduction part 8 and the common liquid chamber substrate 20.

The flow-in channel refers to a channel connected with the individual liquid chamber 6 that is disposed upstream of a position where liquid flows into the individual liquid chamber 6. The flow-in channel corresponds to the liquid introduction part 8 and the common liquid chamber 10.

The diaphragm 3 is a wall member forming the wall of the individual liquid chamber 6 of the channel plate 2. This diaphragm 3 employs a two-layered structure (but not limited thereto) including, from the channel plate 2 side, the first layer forming a thin portion and the second layer forming a thick portion. A vibration area 30 that is deformable is formed at the portion of the first layer corresponding to the individual liquid chamber 6.

The nozzle plate 1 includes multiple nozzles 4 arranged in a zigzag manner, as illustrated in FIG. 6.

Figure 7A:
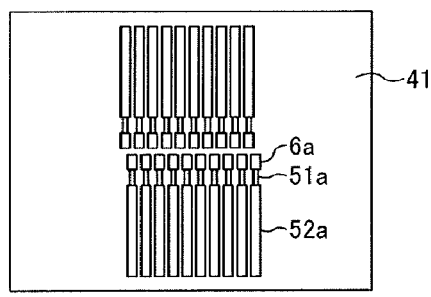
FIGS. 7A to 7F are plan views of members constituting a channel substrate of the head illustrated in FIG. 3.
Figure 8A:
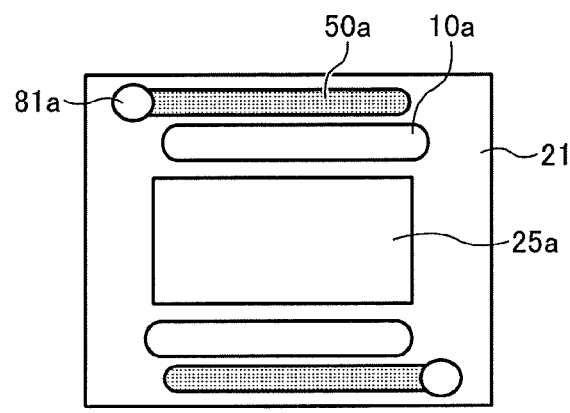
FIGS. 8A and 8B are plan views of members constituting a common liquid chamber substrate of the head illustrated in FIG. 3.
Figure 8B:
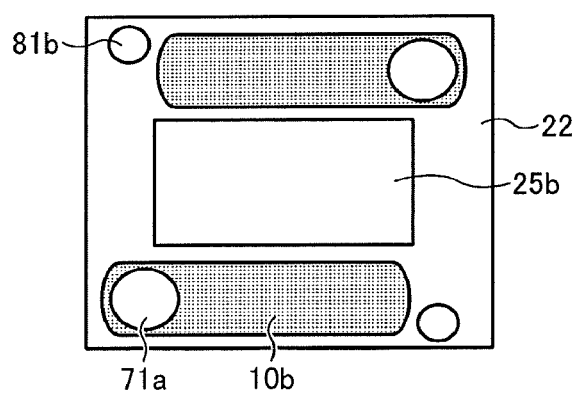

As illustrated in FIG. 7A, the plate-like member 41 constituting the channel plate 2 includes through grooves (meaning through holes having a groove form) 6a each constituting the individual liquid chamber 6, through grooves 51a each constituting a fluid resistance part 51, and through grooves 52a each constituting a circulation channel 52.

Figure 7B:
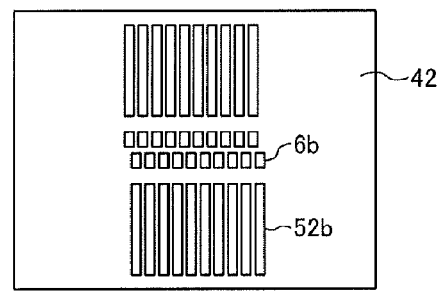

As illustrated in FIG. 7B, the plate-like member 42 includes through grooves 6b each constituting the individual liquid chamber 6 and through grooves 52b each constituting the circulation channel 52.

Figure 7C:
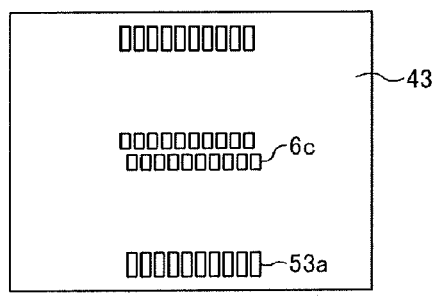
Figure 7D:
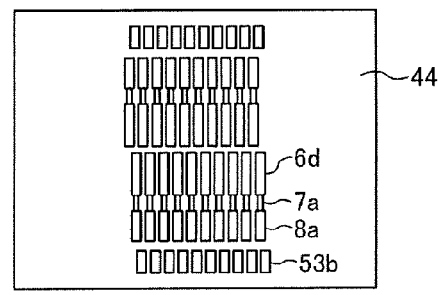

As illustrated in FIG. 7C, the plate-like member 43 includes through grooves 6c each constituting the individual liquid chamber 6 and through grooves 53a each constituting a circulation channel 53. The longitudinal direction of the through grooves 53a is coincident with the nozzle array direction. As illustrated in FIG. 7D, the plate-like member 44 includes through grooves 6d each constituting the individual liquid chamber 6, through grooves 7a each constituting the fluid resistance part 7, through grooves 8a each constituting the liquid introduction part 8, and through grooves 53b each constituting the circulation channel 53. The longitudinal direction of the through grooves 53b is coincident with the nozzle array direction.

Figure 7E:
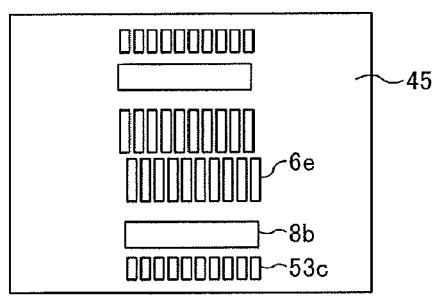

As illustrated in FIG. 7E, the plate-like member 45 includes through grooves 6e each constituting the individual liquid chamber 6, a through groove 8b (serving as a liquid chamber disposed downstream of the filter) constituting the liquid introduction part 8, and through grooves 53c each constituting the circulation channel 53. The longitudinal direction of both the through groove 8b and the through grooves 53c is coincident with the nozzle array direction.

Figure 7F:
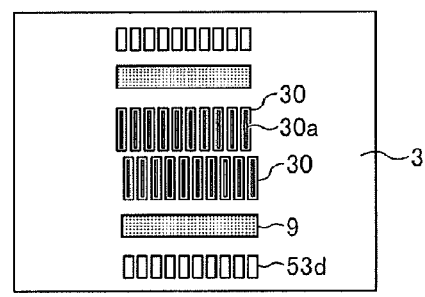

As illustrated in FIG. 7F, the diaphragm 3 includes the vibration areas 30, the filter part 9, and through grooves 53d each constituting the circulation channel 53. The longitudinal direction of the through grooves 53d is coincident with the nozzle array direction.

As a consequence, a complicate channel can be formed by a simple configuration in which multiple plate-like members are attached to each other in a lamination manner.

According to the configuration described above, in the channel substrate 40 formed of the channel plate 2 and the diaphragm 3, the fluid resistance part 51, the circulation channel 52, and the circulation channel 53 are formed. Specifically, the fluid resistance part 51 is formed along the plane direction of the channel plate 2 in communication with the individual liquid chamber 6. The circulation channel 53 is formed in the thickness direction of the channel substrate 40 in communication with the circulation channel 52. The circulation channel 53 is in communication with a circulation common liquid chamber 50 to be described later.

The flow-out channel refers to a channel connected with the individual liquid chamber 6 that is disposed downstream of a position where liquid flows into the individual liquid chamber 6. The flow-out channel corresponds to the circulation channels 52 and 53 and the circulation common liquid chamber 50.

The common liquid chamber substrate 20 forms the common liquid chamber 10, to which the ink is supplied from a supply-circulation mechanism 494 (to be described later), and the circulation common liquid chamber 50.

The common liquid chamber substrate 20 includes a first common liquid chamber substrate 21 and a second common liquid chamber substrate 22. As illustrated in FIG. 8A, the first common liquid chamber substrate 21 includes a through hole 25a for the piezoelectric actuator 11, a through groove 10a serving as a downstream common liquid chamber 10A disposed on the downstream side, and a groove 50a (having the bottom) serving as the circulation common liquid chamber 50.

As illustrated in FIG. 8B, the second common liquid chamber substrate 22 includes a through hole 25b for the piezoelectric actuator 11 and a groove 10b serving as an upstream common liquid chamber 10B disposed on the upstream side.

The second common liquid chamber substrate 22 further includes a through hole 71a to communicate one end of the common liquid chamber 10 in the nozzle array direction with a supply port 71 illustrated in FIG. 3.

Similarly, the first common liquid chamber substrate 21 and the second common liquid chamber substrate 22 include a through hole 81a and a through hole 81b, respectively, to communicate the other end (the opposite end on the side of the through hole 71a) of the circulation common liquid chamber 50 in the nozzle array direction with a circulation port 81.

In FIGS. 8A and 8B, the grooves having the bottom are hatched. (The same applies to other drawings.)

The common liquid chamber substrate 20 includes the first common liquid chamber substrate 21 and the second common liquid chamber substrate 22, as described above.

The first common liquid chamber substrate 21 is attached to the channel substrate 40 on the diaphragm 3 side and the second common liquid chamber substrate 22 is attached to and laminated on the first common liquid chamber substrate 21.

The first common liquid chamber substrate 21 forms the downstream common liquid chamber 10A, constituting a part of the common liquid chamber 10 in communication with the liquid introduction part 8, and the circulation common liquid chamber 50 in communication with the circulation channel 53. The second common liquid chamber substrate 22 forms the upstream common liquid chamber 10B constituting the rest of the common liquid chamber 10.

The downstream common liquid chamber 10A constituting a part of the common liquid chamber 10 and the circulation common liquid chamber 50 are disposed next to each other in a direction perpendicular to the nozzle array direction. The circulation common liquid chamber 50 is disposed at the position projected in the common liquid chamber 10.

By this disposition, the dimension of the circulation common liquid chamber 50 is free of the restriction ascribable to the dimensions required for the individual liquid chamber 6, the fluid resistance part 7, and the liquid introduction part 8 formed in the channel substrate 40.

Since the circulation common liquid chamber 50 and a part of the common liquid chamber 10 are disposed side by side and the circulation common liquid chamber 50 is located at the position projected in the common liquid chamber 10, the width of the head in a direction perpendicular to the nozzle array direction is restricted, thereby preventing size increase of the head. The common liquid chamber substrate 20 forms the common liquid chamber 10, to which the ink is supplied from a head tank or an ink cartridge, and the circulation common liquid chamber 50.

On the other side of the diaphragm 3 opposite to the individual liquid chamber 6, the piezoelectric actuator 11 is disposed. The piezoelectric actuator 11 includes an electromechanical transducer element serving as a driver that deforms the vibration area 30 of the diaphragm 3.

As illustrated in FIG. 5, this piezoelectric actuator 11 includes a piezoelectric member 12 attached to a base material 13. The piezoelectric member 12 is grooved by half cut dicing and a particular number of piezoelectric elements (piezoelectric pillars) 12A and 12B each having a pillar-like form are formed in the piezoelectric member 12 spaced a predetermined distance therebetween in a pectinate manner.

In the present embodiment, the piezoelectric element 12A is driven by application of a drive waveform while the piezoelectric element 12B is not driven but simply used as a pillar. Alternatively, all of the piezoelectric elements 12A and 12B can be used as the piezoelectric element to be driven by application of drive waveforms.

The piezoelectric element 12A is attached to a convex portion 30a that is a thick portion having an island-like form formed on the vibration area 30 of the diaphragm 3. The piezoelectric element 12B is attached to a convex portion 30b that is a thick portion of the diaphragm 3.

The piezoelectric member 12 includes piezoelectric layers and internal electrodes alternately laminated on each other. Each internal electrode is pulled out to the end surface to form an external electrode. The external electrode is connected with a flexible wiring member 15.

In the circulation-type discharge head having such a configuration, the piezoelectric element 12A is contracted by lowering the voltage applied to the piezoelectric element 12A in comparison with a reference voltage. As a result, the vibration area 30 of the diaphragm 3 is lowered and the individual liquid chamber 6 is inflated, thereby letting the ink flow into the individual liquid chamber 6.

The piezoelectric element 12A is thereafter expanded in the lamination direction by raising the voltage applied to the piezoelectric element 12A. Thus, the vibration area 30 of the diaphragm 3 is deformed toward the nozzle 4 and the individual liquid chamber 6 is contracted. As a result, the ink in the individual liquid chamber 6 is pressurized and discharged from the nozzle 4.

The voltage applied to the piezoelectric element 12A is thereafter returned to the reference voltage to restore the vibration area 30 of the diaphragm 3 to the initial position. As a result, the individual liquid chamber 6 is inflated to generate a negative pressure, and the ink is supplied from the common liquid chamber 10 to the individual liquid chamber 6. After the vibration of the meniscus surface of the nozzle 4 has attenuated and stabilized, the operation transits to next discharge procedure.

The drive method of the head is not limited to the above-described method (i.e., pull-push discharging). The way of discharging changes depending on how a drive waveform is applied. For example, pull discharging or push discharging is possible. In addition, in the embodiments described above, a lamination-type piezoelectric element is used as a pressure generator to cause pressure fluctuation to the individual liquid chamber 6, but the pressure generator is not limited thereto. It is possible to use a piezoelectric element having a thin-film like form. Furthermore, it is possible to dispose a heat element in the individual liquid chamber 6 to form bubbles by heat, thereby generating pressure fluctuation, or to utilize electrostatic force to cause pressure fluctuation.

Next, one example of an ink circulation system using the circulation-type discharge head is described with reference to FIG. 9.

Figure 9:
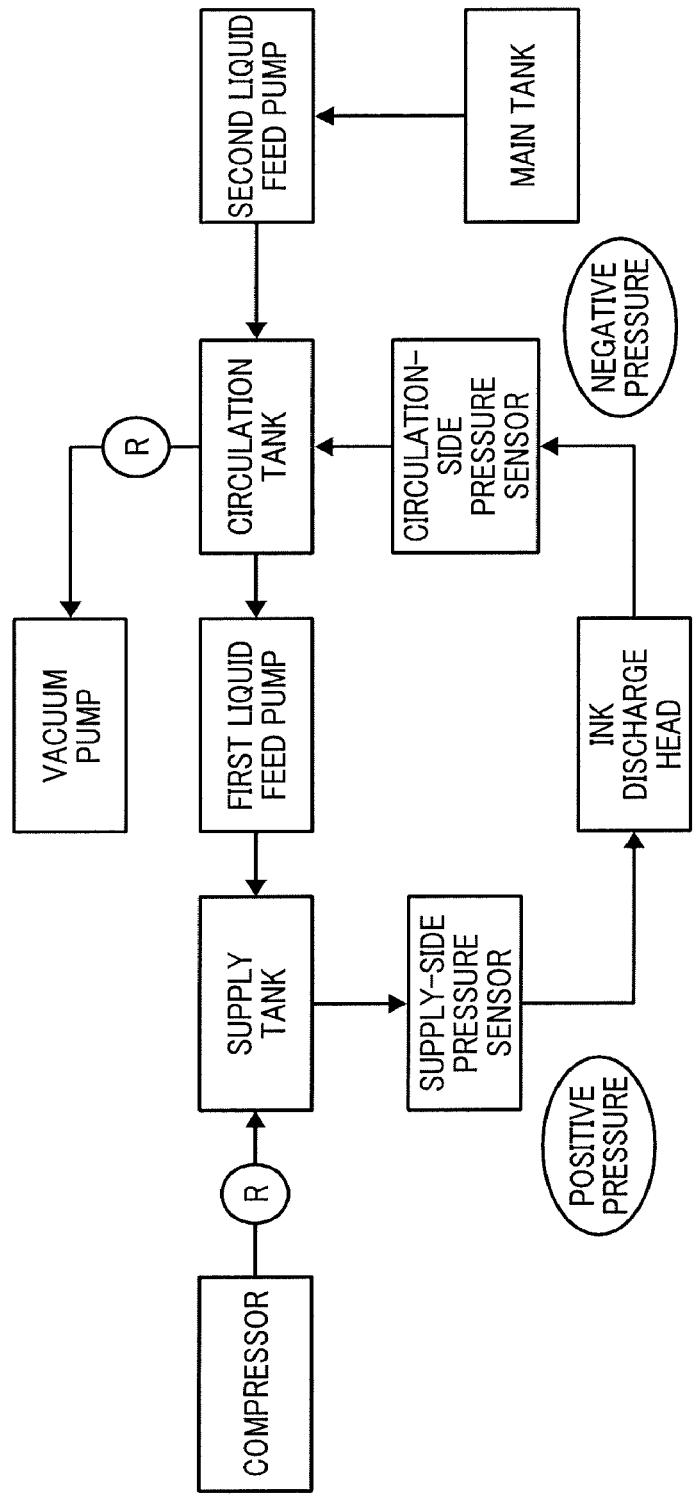
FIG. 9 is a block diagram of an ink circulation system in accordance with some embodiments of the present invention.

FIG. 9 is a block diagram of an ink circulation system.

As illustrated in FIG. 9, the ink circulation system includes a main tank, an ink discharge head, a supply tank, a circulation tank, a compressor, a vacuum pump, a first liquid feed pump, a second liquid feed pump, regulators (R), a supply-side pressure sensor, and a circulation-side pressure sensor. The vacuum pump serves as the negative pressure generator. The supply-side pressure sensor is disposed between the supply tank and the ink discharge head and connected with the supply channel side of the ink discharge head connected with the supply port 71 (illustrated in FIG. 3). The circulation-side pressure sensor is disposed between the ink discharge head and the circulation tank and connected with the circulation channel side of the ink discharging head connected with the circulation port 81 (illustrated in FIG. 3).

One end of the circulation tank is connected with the supply tank via the first liquid feed pump and the other end thereof is connected with the main tank via the second liquid feed pump. The ink flows from the supply tank into the ink discharge head via the supply port 71, and is discharged to the circulation tank via the circulation port 81. The ink is further fed from the circulation tank to the supply tank by the first liquid feed pump, thus circulating the ink.

The compressor is connected with the supply tank to control such that the supply-side pressure sensor detects a predetermined positive pressure. The vacuum pump is connected with the circulation tank to control such that the circulation-side pressure sensor detects a predetermined negative pressure. Accordingly, while the ink is circulated through the ink discharge head, the negative pressure of the meniscus can be kept constant.

In addition, as liquid droplets are discharged from the nozzle of the circulation-type discharge head, the amount of the ink in the supply tank and the circulation tank decreases. Therefore, it is preferable to properly supply the ink from the main tank to the circulation tank with the second liquid feed pump. The timing of the ink supply from the main tank to the circulation tank can be controlled according to the detection result of the liquid surface sensor disposed in the circulation tank. For example, the ink can be supplied when the liquid surface of the ink in the circulation tank is lowered in comparison with the predetermined height.

Next, the circulation of the ink in the circulation-type discharge head is described below. As illustrated in FIG. 3, the supply port 71 communicating with the common liquid chamber 10 and the circulation port 81 communicating with the circulation common liquid chamber 50 are formed on one end of the common liquid chamber substrate 20. The supply port 71 and the circulation port 81 are respectively connected with the supply tank and the circulation tank (illustrated in FIG. 9), for storing the liquid, via tubes. The ink stored in the supply tank is supplied to the individual liquid chamber 6 via the supply port 71, the common liquid chamber 10, the liquid introduction part 8, and the fluid resistance part 7.

Moreover, while the ink in the individual liquid chamber 6 is discharged from the nozzle 4 due to drive of the piezoelectric member 12, a part or the entire of the ink remaining in the individual liquid chamber 6 without being discharged is circulated toward the circulation tank via the fluid resistance part 51, the circulation channels 52 and 53, the circulation common liquid chamber 50, and the circulation port 81.

The ink can be circulated regardless of whether the circulation-type discharge head is in operation or not. Circulating the ink during waiting time is preferable because the ink in the individual liquid chamber is constantly refreshed and agglomeration or sedimentation of the component contained in the ink can be suppressed. The vacuum pump is connected with the circulation tank for keeping the negative pressure of the meniscus constant. However, in a case in which the ink contains a highly-volatile component, a problem arises that such a component gradually volatilizes to change the composition of the liquid with time. In particular, the ink in accordance with some embodiments of the present invention containing the organic solvent X having a solubility parameter of from 8.9 to 12.0 becomes more hydrophobic as moisture and the compound Z, which are easy to volatilize, evaporate from the ink. As the balance between hydrophilicity and hydrophobicity is thus changed, dispersion stability of the pigment in the ink is lowered and irregular discharge is likely to occur in a continuous printing. On the other hand, since the ink in accordance with some embodiments of the present invention can maintain good dispersion stability even in a highly hydrophobic state, the ink in combination with the circulation-type discharge head provide high quality images without irregular discharge or defective image at a high productivity.

Figure 10:
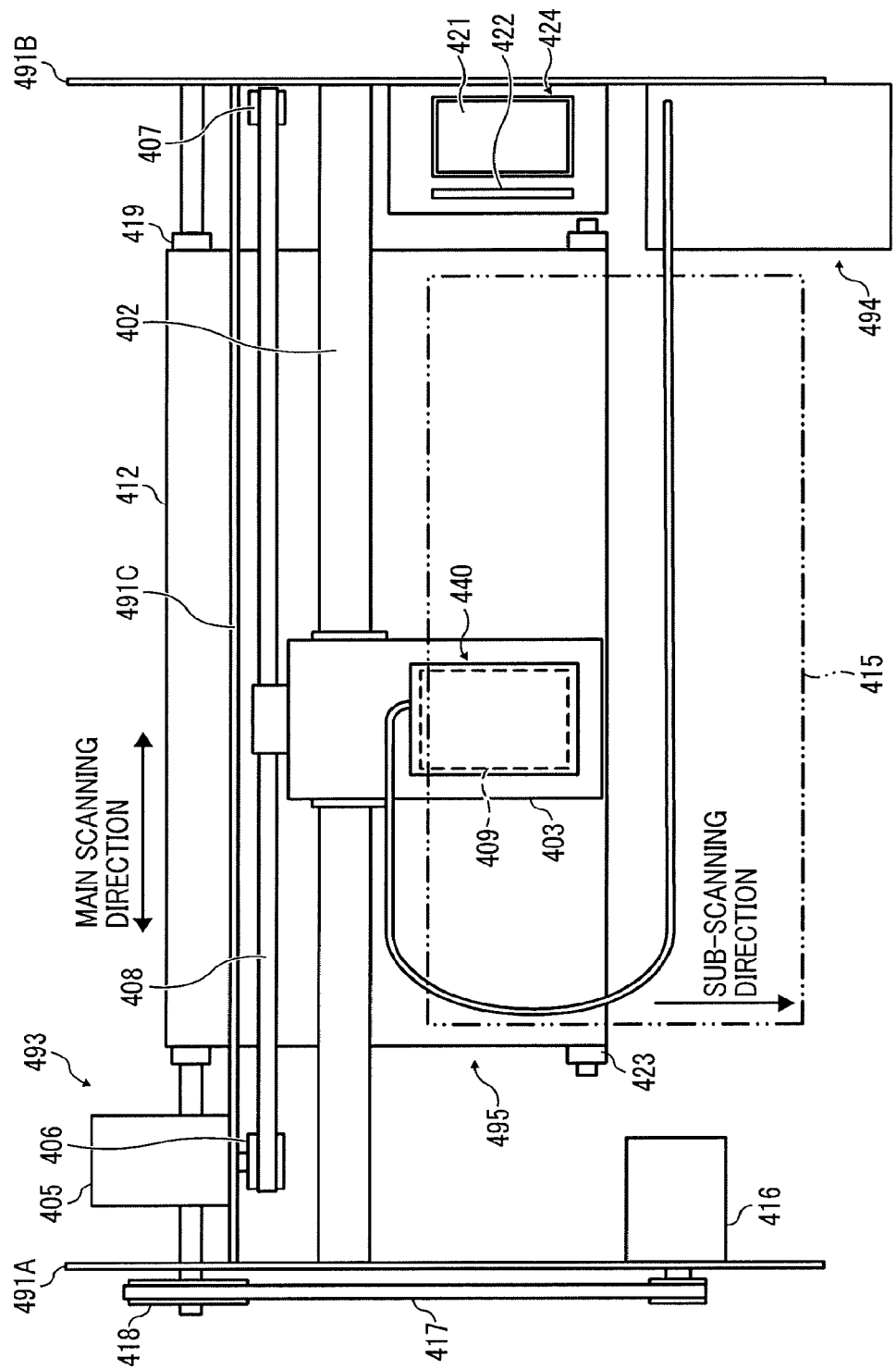
FIG. 10 is a plan view of a major part of an ink discharge device in accordance with some embodiments of the present invention.
Figure 11:
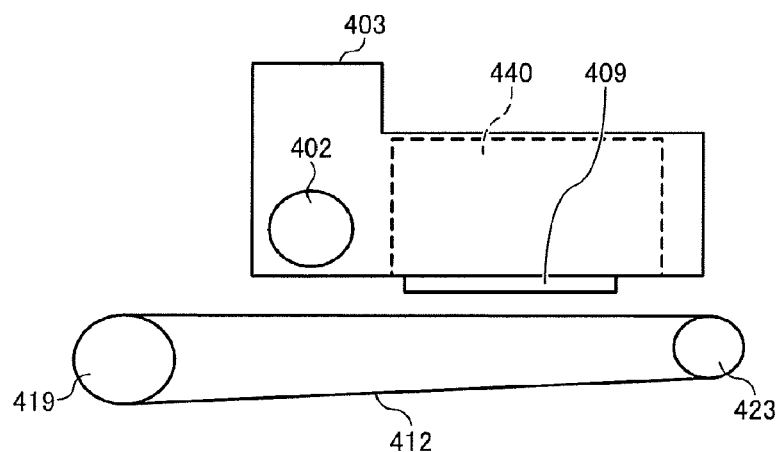
FIG. 11 is a side view of a major part of the ink discharge device illustrated in FIG. 10.

One example of the ink discharge device using a circulation-type discharge head is described below with reference to FIGS. 10 and 11. FIG. 10 is a plan view of a major part of the ink discharge device. FIG. 11 is a side view of a major part of the ink discharge device.

This device is a serial-type device in which a main scanning moving mechanism 493 reciprocates a carriage 403 in the main scanning direction. The main scanning moving mechanism 493 includes a guide member 402, a main scanning motor 405, and a timing belt 408. The guide member 402 is bridged between the right and left side plates 491A and 491B to moveably hold the carriage 403. The main scanning motor 405 reciprocates the carriage 403 in the main scanning direction via the timing belt 408 bridged between a drive pulley 406 and a driven pulley 407.

The carriage 403 carries an ink discharge unit 440 carrying an ink discharge head 409. The ink discharge head 409 of the ink discharge unit 440 discharges color liquids of, for example, yellow (Y), cyan (C), magenta (M), and black (K). The ink discharge head 409 has nozzle arrays each including multiple nozzles arranged in the sub-scanning direction that is perpendicular to the main scanning direction. The ink discharge head 409 is mounted on the ink discharge unit 440 with its discharging surface facing downward.

The ink stored outside the ink discharge head 409 is supplied to and circulated in the ink discharge head 409 by a supply-circulation mechanism 494. The supply-circulation mechanism 494 includes a supply tank, a circulation tank, a compressor, a vacuum pump, a liquid feed pump, and a regulator (R). The supply-side pressure sensor is disposed between the supply tank and the ink discharge head and connected with the supply channel side of the ink discharge head connected with the supply port 71. The circulation-side pressure sensor is disposed between the ink discharge head and the circulation tank and connected with the circulation channel side of the ink discharging head connected with the circulation port 81.

This device further includes a conveyance mechanism 495 to convey a recording medium 415. The conveyance mechanism 495 includes a conveyance belt 412 serving as a conveyer and a sub-scanning motor 416 to drive the conveyance belt 412.

The conveyance belt 412 adsorbs the recording medium 415 and conveys it to the position facing the ink discharge head 409. The conveyance belt 412 is in the form of an endless belt stretched between a conveyance roller 419 and a tension roller 423. The conveyance belt 412 adsorbs the recording medium 415 by electrostatic adsorption or suction.

The conveyance belt 412 moves around in the sub-scanning direction as the conveyance roller 419 is rotationally driven by the sub-scanning motor 416 via a timing belt 417 and a timing pulley 418.

On one side of the carriage 403 in the main scanning direction, a maintenance mechanism 424 for maintaining the ink discharge head 409 is disposed lateral to the conveyance belt 412.

The maintenance mechanism 424 includes a capping member 421 to cap a nozzle surface (surface on which the nozzle is formed) of the ink discharge head 409 and a wiping member 422 to wipe off the nozzle surface.

The main scanning moving mechanism 493, the supply-circulation mechanism 494, the maintenance mechanism 424, and the conveyance mechanism 495 are installed onto a housing including the side plates 491A and 491B and a back plate 491C.

In this device having such a configuration, the recording medium 415 is fed and adsorbed onto the conveyance belt 412 and conveyed along the sub-scanning direction by the rotational movement of the conveyance belt 412.

By driving the ink discharge head 409 in response to an image signal while moving the carriage 403 in the main-scanning direction, the ink is discharged onto the recording medium 415 not in motion to record an image.

Since the circulation-type discharge head is provided in this device, high quality images can be stably formed.

Figure 12:
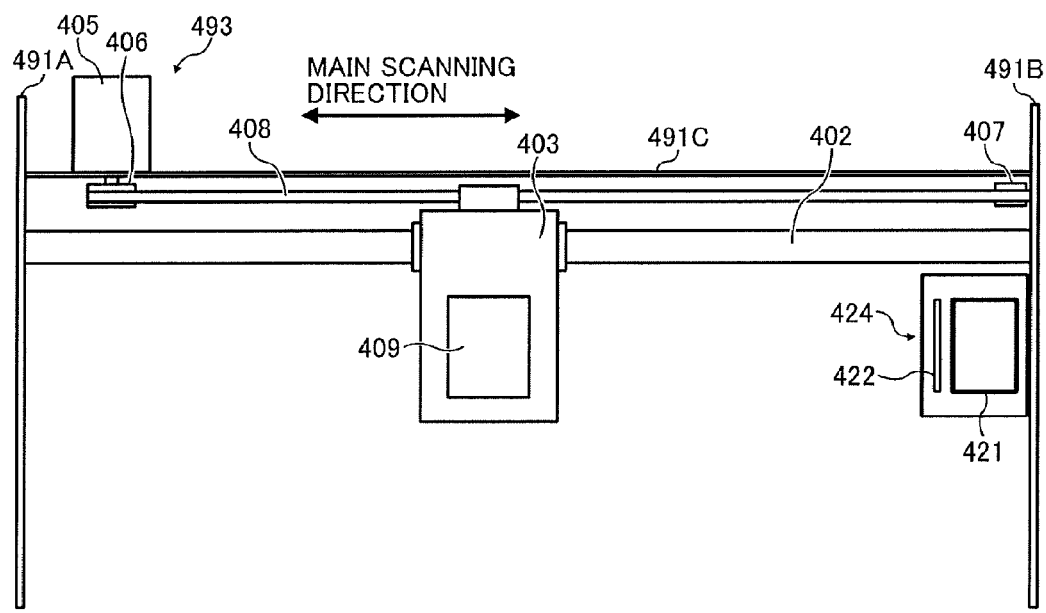
FIG. 12 is a plan view of a major part of an ink discharge unit in accordance with some embodiments of the present invention.

Next, an ink discharge unit is described with reference to FIG. 12 as another example. FIG. 12 is a plan view of a major part of the ink discharge unit.

This ink discharge unit is constituted of the housing portion including the side plates 491A and 491B and the back plate 491C, the main scanning moving mechanism 493, the carriage 403, and the ink discharge head 409, which are the same members constituting the above-described ink discharge device.

Optionally, the ink discharging unit can be constituted in such a manner that at least one of the maintenance mechanism 424 and the supply-circulation mechanism 494 is further attached to, for example, the side plate 491B.

In the present disclosure, an "ink discharge head" refers to a functional part configured to discharge or eject an ink from a nozzle.

As energy sources for discharging the ink, piezoelectric actuators (e.g., laminated piezoelectric elements, thin-film piezoelectric elements), thermal actuators using electrothermal conversion elements such as heat elements, and electrostatic actuators formed of a vibration plate and a counter electrode may be used.

In the present disclosure, an "ink discharge unit" refers to an ink discharge head integrated with functional components/mechanisms, i.e., an aggregation of components related to ink discharge. For example, the ink discharge unit may include a combination of an ink discharge head with at least one of a supply-circulation mechanism, a carriage, a maintenance mechanism, and a main scanning moving mechanism.

When it is stated that an ink discharge head and functional components/mechanisms are integrated with each other, it refers to a case in which the ink discharge head and the functional components/mechanisms are secured to each other by means of fastening, bonding, or engaging, or another case in which one of the ink discharge head and the functional components/mechanisms is movably supported by the other one of them. In addition, it also refers to a case in which the ink discharge head and the functional components/mechanisms are detachably attached to each other.

Examples of the ink discharge unit further include an ink discharge head integrated with a supply-circulation mechanism. In this case, the ink discharge head and the supply-circulation mechanism may be connected to each other with a tube. Furthermore, a filter unit may be disposed between the supply-circulation mechanism and the ink discharge head.

Examples of the ink discharge unit further include an ink discharge head integrated with a carriage.

Examples of the ink discharge unit further include an ink discharge head integrated with a scanning moving mechanism in such a manner that the ink discharge head is movably supported by a guide member that constitutes a part of the scanning moving mechanism.

Examples of the ink discharge unit further include an ink discharge head integrated with a carriage and a maintenance mechanism in such a manner that the ink discharge head is mounted on the carriage and a cap member of the maintenance mechanism is secured to the carriage.

Examples of the ink discharge unit further include an ink discharge head integrated with a supply mechanism in such a manner that a supply-circulation mechanism or a flow channel member is mounted on the ink discharge head and a tube is connected to the ink discharge head. The ink stored in an ink container is supplied to the ink discharge head via the tube.

Examples of the main scanning moving mechanism include a single guide member. Examples of the supply mechanism include a single tube or a single loading port.

In the present disclosure, an "ink discharge device" refers to a device including an ink discharge head or an ink discharge unit, configured to discharge an ink by driving the ink discharge head. Examples of the ink discharge device include a device capable of discharging an ink to a substance to which the ink is adherable and another device capable of discharging an ink toward a gas or into a liquid.

The ink discharge device may further optionally include devices relating to feeding, conveying, and ejecting of the substance to which the ink is adherable and other devices referred to as a pretreatment device or an aftertreatment device.

Specific examples of the ink discharge device include an image forming apparatus configured to discharge an ink onto a sheet to form an image thereon, and a three-dimensional object forming apparatus configured to discharge an ink onto a powder lamination layer to form a three-dimensional object.

In addition, the ink discharge device is not limited to those producing merely meaningful visible images such as texts and figures with the ink. For example, the ink discharge device can produce patterns like geometric design and three-dimensional images.

Examples of the ink discharge device further include a device in which an ink discharge head and a substance to which an ink is adherable are movable relative to each other, but are not limited thereto. Specific examples of such a device include a serial-type device in which an ink discharge head is movable and a line-type device in which an ink discharge head is unmovable.

In the present disclosure, "image forming", "recording", "printing", etc. are treated as synonymous terms.

Heat-Dryer and Heat-Drying Process

The ink discharge device in accordance with some embodiments of the present invention may further include a heat-dryer, such as infrared dryer, microwave dryer, roll heater, drum heater, and hot air dryer, for drying a recording medium having in the ink thereon. The ink discharge method in accordance with some embodiments of the present invention may further include a heat-drying process after the ink discharge process.

The ink discharge device may further include a fixer for smoothing the surface of the resulting image or fixing the image on a recording medium. The ink discharge method may further include a fixing process for heating the image to 100° C. to 150° C. by a heater to fix the image on a recording medium. The fixing process improves glossiness and fixation strength of the image on a recording medium. Preferred examples of the fixer include a heat-fixer such as a roll heater or drum heater having a heated specular surface. The specular surface (flat portion) of the roller heater or drum heater is brought in contact with the surface of the image. Preferably, a fixing roller heated to 100° C. to 150° C. is preferable for image quality, safety, and cost.

Figure 13:
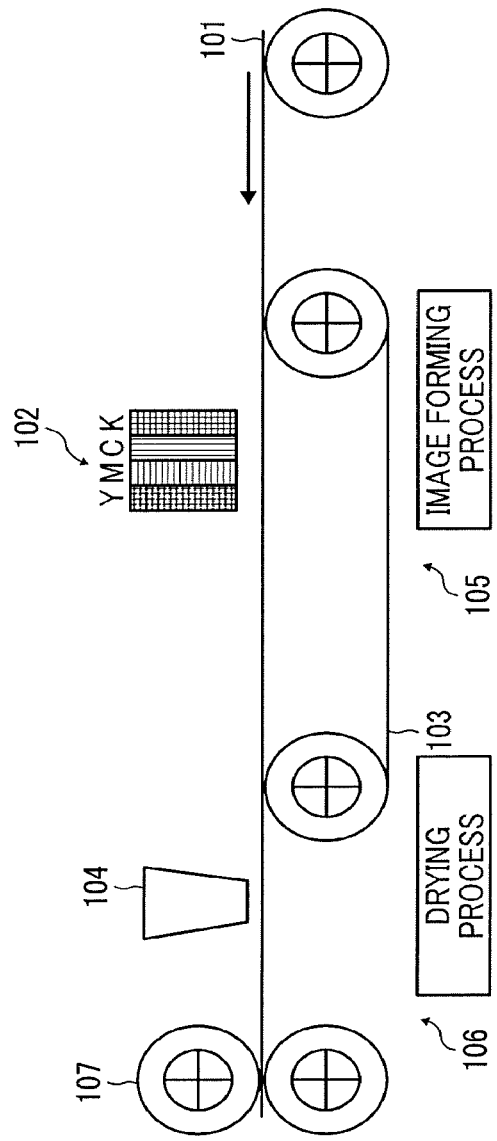
FIG. 13 is a schematic view of an ink discharge device in accordance with some embodiments of the present invention.

FIG. 13 is a schematic view of an image forming apparatus in accordance with some embodiments of the present invention.

This image forming apparatus is configured to perform an image forming process and a drying process. The image forming apparatus includes a recording medium 101, an ink discharger 102, a conveyance belt 103, a hot air dryer 104, an image forming unit 105, a dry treatment unit 106, and a transfer roll 107.

EXAMPLES

Further understanding can be obtained by reference to certain specific examples which are provided herein for the purpose of illustration only and are not intended to be limiting. In the descriptions in the following examples, the numbers in parts represent mass ratios in parts, and "%" represents "% by mass", unless otherwise specified.

Synthesis of Copolymers
Synthesis of Monomer

In 700 mL of methylene chloride, 62.0 g (525 mmol) of 1,6-hexanediol (available from Tokyo Chemical Industry Co., Ltd.) was dissolved and 20.7 g (262 mmol) of pyridine was added. A solution of 50.0 g (262 mmol) of 2-naphthalenecarbonyl chloride (available from Tokyo Chemical Industry Co., Ltd.) dissolved in 100 mL of methylene chloride was dropped in the above liquid over a period of 2 hours while stirring the liquid, and the mixture liquid was successively stirred for 6 hours at room temperature. The resulting reaction liquid was thereafter washed with water and the organic phase was isolated. The isolated organic phase was dried with magnesium sulfate and the solvent was distilled away. The organic phase was further purified by silica gel column chromatography using a mixture solvent of methylene chloride/methanol (at a volume ratio of 98/2) as the eluent, thus obtaining 52.5 g of 2-naphthoic acid 2-hydroxyhexyl ester.

Next, 42.1 g (155 mmol) of 2-naphthoic acid 2-hydroxyhexyl ester was dissolved in 80 mL of dry methyl ethyl ketone and heated to 60° C. Another solution of 24.0 g (155 mmol) of KARENZ MOI (2-methacryloyloxyethyl isocyanate available from Showa Denko K.K.) dissolved in 20 mL of dry methyl ethyl ketone was dropped in the above solution over a period of 1 hour while stirring the solution, and the mixture liquid was successively stirred for 12 hours at 70° C. The resulting reaction liquid was thereafter cooled to room temperature and the solvent was distilled away. The reaction liquid was further purified by silica gel column chromatography using a mixture solvent of methylene chloride/methanol (at a volume ratio of 99/1) as the eluent, thus obtaining 57.0 g of a monomer M-1 represented by the following formula (I-1).

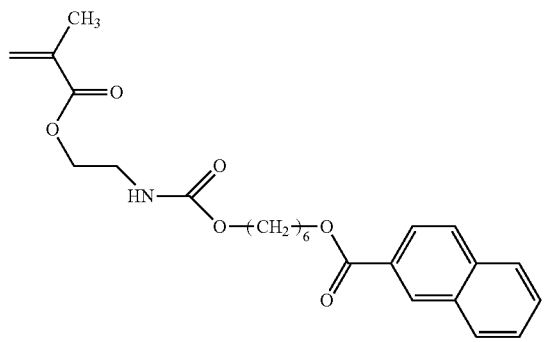

Formula (I-1)

Synthesis of Copolymer R-1

First, 3.80 g (52.7 mmol) of acrylic acid (available from Sigma-Aldrich) and 11.26 g (26.3 mmol) of the monomer M-1 were dissolved in 75 mL of dry methyl ethyl ketone to prepare a monomer solution. Ten percent (10%) of the monomer solution was heated to 75° C. under argon gas flow. In the rest (90%) of the monomer solution, a solution of 0.59 g (3.61 mmol) of 2,2'-azoiso(butyronitrile) (available from Tokyo Chemical Industry Co., Ltd.) was dropped over a period of 1.5 hours, and the mixture was stirred at 75° C. for 4 hours. The resulting reaction liquid was cooled to room temperature and poured in hexane. The deposited copolymer was filtered and dried under reduced pressures, thus obtaining 14.55 g of a copolymer R-1 (having a weight average molecular weight (Mw) of 30,000).

Next, 5.00 g of the copolymer R-1 (corresponding to 17.5 mmol of carboxyl group) was weighed and stir-mixed with 7.36 g of a 35% aqueous solution of tetraethylammonium hydroxide (available from Tokyo Chemical Industry Co., Ltd., corresponding to 17.5 mmol of tetraethylammonium ion) and 37.64 g of ion-exchange water, thus obtaining a 10% aqueous solution of the copolymer R-1.

Synthesis of Copolymer R-2

First, 24.77 g (52.7 mmol) of methoxypolyethylene glycol acrylate (BLEMMER® AME-400 available from NOF CORPORATION) and 11.26 g (26.3 mmol) of the monomer M-1 were dissolved in 75 mL of dry methyl ethyl ketone to prepare a monomer solution. Ten percent (10%) of the monomer solution was heated to 75° C. under argon gas flow. In the rest (90%) of the monomer solution, a solution of 0.59 g (3.61 mmol) of 2,2'-azoiso(butyronitrile) (available from Tokyo Chemical Industry Co., Ltd.) was dropped over a period of 1.5 hours, and the mixture was stirred at 75° C. for 4 hours. The resulting reaction liquid was cooled to room temperature and poured in hexane. The deposited copolymer was filtered and dried under reduced pressures, thus obtaining 34.23 g of a copolymer R-2 (having a weight average molecular weight (Mw) of 40,000).

Next, 5.00 g of the copolymer R-2 was weighed and stir-mixed with 45.00 g of ion-exchange water, thus obtaining a 10% aqueous solution of the copolymer R-2.

Synthesis of Copolymer R-3

In 2.02 g (28.0 mmol) of acrylic acid, 59.8 g (140 mmol) of the monomer M-1 was dissolved, and 100 g of ion-exchange water, 3.00 g of AKUARON KH-10 (anionic radical-reactive surfactant, available from DKS Co., Ltd.), and 1.00 g of ammonium persulfate were further added thereto. The mixture was formed into a pre-emulsion by a homomixer. Next, 2.00 g of AKUARON KH-10 was added to 100 g of ion-exchange water and heated to 80° C. under argon airflow. Ten percent (10%) of the pre-emulsion was added thereto to be subjected to an initial polymerization for 30 minutes.

The rest (90%) of the pre-emulsion was further dropped therein over a period of 2 hours to be subjected to a polymerization. The polymerization was further conducted for 2 hours at 80° C. The resulting reaction liquid was filtered and neutralized with ammonia water. Thus, a dispersion of a copolymer R-3 (having a weight average molecular weight (Mw) of 21,000 and a number average molecular weight (Mn) of 9,700) having a solid content concentration of 30% was obtained.

Preparation of Pigment Dispersions

Preparation Example 1

Preparation of Black Pigment Dispersion PD-1

First, 16.0 parts of a carbon black (NIPEX 160 available from Deggusa) and 44.0 parts of ion-exchange water were added to 40.0 parts of a 10% aqueous solution of the copolymer R-1 and the mixture was stirred for 12 hours. The mixture was thereafter subjected to circulation dispersion for 1 hour using a disc-type bead mill KDL (available from Shinmaru Enterprises Corporation) at a peripheral speed of 10 m/s. The media of the bead mill were zirconia balls having a diameter of 0.3 mm. The mixture was thereafter filtered with a membrane filter having a pore diameter of 1.2 m. An amount of ion-exchange water was added thereto so that the pigment concentration became 16% by mass. Thus, a black pigment dispersion PD-1 was prepared.

Preparation Example 2

Preparation of Black Pigment Dispersion PD-2

The procedure for preparing the pigment dispersion PD-1 was repeated except for replacing 40.0 parts of the 10% aqueous solution of the copolymer R-1 with 40.0 parts of a 10% aqueous solution of the copolymer R2. Thus, a black pigment dispersion PD-2 having a pigment concentration of 16% by mass was prepared.

Preparation Example 3

Preparation of Black Pigment Dispersion PD-3

The procedure for preparing the pigment dispersion PD-1 was repeated except for replacing 40.0 parts of the 10% aqueous solution of the copolymer R-1 with 16.0 parts of a wet dispersant byk 190 (available from BYK Japan KK, having a solid content concentration of 40% by mass) and changing the amount of ion-exchange water from 44.0 parts to 68.0 parts. Thus, a black pigment dispersion PD-3 having a pigment concentration of 16% by mass was prepared.

It was confirmed that the the wet dispersant byk 190 had no naphthyl group, because no peak was detected at 284 nm in a ultraviolet-visible absorption spectrum of a 300-fold diluted solution of the wet dispersant byk 190 in ion-exchange water, measured by a spectrophotometer UH-3900H. Thus, it was confirmed that the structural unit represented by the formula (1) was not included in the wet dispersant byk 190.

Preparation Example 4

Preparation of Cyan Pigment Dispersion PD-4

The procedure for preparing the pigment dispersion PD-1 was repeated except for replacing the carbon black with Pigment Blue 15:3 (CHROMOFINE BLUE available from Dainichiseika Color & Chemicals Mfg. Co., Ltd.). Thus, a cyan pigment dispersion PD-4 having a pigment concentration of 16% by mass was prepared.

Preparation Example 5

Preparation of Magenta Pigment Dispersion PD-5

The procedure for preparing the pigment dispersion PD-1 was repeated except for replacing the carbon black with Pigment Red 122 (TONER MAGENTA E002 available from Clariant). Thus, a magenta pigment dispersion PD-5 having a pigment concentration of 16% by mass was prepared.

Preparation Example 6

Preparation of Yellow Pigment Dispersion PD-6

The procedure for preparing the pigment dispersion PD-1 was repeated except for replacing the carbon black with Pigment Yellow 74 (FAST YELLOW 531 available from Dainichiseika Color & Chemicals Mfg. Co., Ltd.). Thus, a yellow pigment dispersion PD-6 having a pigment concentration of 16% by mass was prepared.

Preparation of Water-Dispersible Resin Dispersion

Preparation Example 7

Preparation of Resin Particle Dispersion 1

After sufficiently replacing the air in a 1-L flask equipped with a mechanical stirrer, a thermometer, a nitrogen gas inlet pipe, a reflux pipe, and a dropping funnel with nitrogen gas, 8.0 g of LATEMUL S-180 (reactive anionic surfactant, available from Kao Corporation) was mixed in 350 g of ion-exchange water in the flask and heated to 65° C. Next, 3.0 g of t-butyl peroxybenzoate (serving as a reaction initiator) and 1.0 g of sodium isoascorbate were added to the flask. Five minutes later, a mixture of 45 g of methyl methacrylate, 160 g of 2-etyhylhexyl methacrylate, 5 g of acrylic acid, 45 g of butyl methacrylate, 30 g of cyclohexyl methacrylate, 15 g of vinyl triethoxysilane, 8.0 g of LATEMUL S-180, and 340 g of ion-exchange water was dropped in the flask over a period of 3 hours. The flask contents were aged at 80° C. for 2 hours and cooled to normal temperature. The pH thereof was adjusted to 7 to 8 using sodium hydroxide. Ethanol was removed using an evaporator and the moisture content was controlled. Thus, 730 g of an acrylic-silicone polymer particle dispersion having a solid content concentration of 40% was obtained. The volume average particle diameter ($D_{50}$) of the polymer particles in the dispersion measured by a particle size distribution analyzer (NANOTRAC UPA-EX150 available from Nikkiso Co., Ltd.) was 125 nm.

Preparation of Inks I-1 to I-19 and RI-1 to RI-3

In a vessel equipped with a stirrer, 24.00 parts of 3-ethyl-3-hydroxymethyloxetane represented by the formula (4-1), 5.00 parts of propylene glycol monopropyl ether, 3.00 parts of glycerin (having a solubility parameter of 16.38), 5.00 parts of triethylene glycol (having a solubility parameter of 15.40), and 2.00 parts of a surfactant (TEGO Wet 270) were stir-mixed for 30 minutes. Next, 40.00 parts of the black pigment dispersion PD-1 and 16.00 parts of ion-exchange water were added thereto and stir-mixed for 60 minutes. Further, 5.00 parts of the resin particle dispersion 1 was added thereto and stir-mixed for 30 minutes. The resulting mixture was subjected to pressure filtration using a polyvinylidene fluoride membrane filter having an average pore diameter of 1.2 m to remove coarse particles and foreign substances. Thus, an ink I-1 was prepared.

Example Inks I-2 to I-19 and Comparative Example Inks RI-1 to RI-3 were prepared in the same manner as Ink I-1 except for changing the composition as described in Table 1-1. Specifically, the organic solvent X, compound Z, other solvent, and surfactant were stir-mixed first, the pigment dispersion and ion-exchange water were stir-mixed therein next, and the water-dispersible resin was further stir-mixed therein last. Each resulting mixture was subjected to pressure filtration using a polyvinylidene fluoride membrane filter having an average pore diameter of 1.2 m to remove coarse particles and foreign substances. Thus, Inks I-2 to I-19 and Example Inks RI-1 to RI-3 were prepared.

Preparation of Inks II-1 to II-19 and RII-1 to RII-3

In a vessel equipped with a stirrer, 24.00 parts of 3-ethyl-3-hydroxymethyloxetane represented by the formula (4-1), 5.00 parts of propylene glycol monopropyl ether, 3.00 parts of glycerin, 5.00 parts of triethylene glycol, 0.67 parts of a wax/water dispersion liquid AQUACER 531 (having a solid content concentration of 45% by mass), and 2.00 parts of a surfactant (TEGO Wet 270) were stir-mixed for 30 minutes. Next, 40.00 parts of the black pigment dispersion PD-1 and 15.33 parts of ion-exchange water were added thereto and stir-mixed for 60 minutes. Further, 5.00 parts of the resin particle dispersion 1 was added thereto and stir-mixed for 30 minutes. The resulting mixture was subjected to pressure filtration using a polyvinylidene fluoride membrane filter having an average pore diameter of 1.2 m to remove coarse particles and foreign substances. Thus, an ink II-1 was prepared.

Example Inks II-2 to II-19 and Comparative Example Inks RII-1 to RII-3 were prepared in the same manner as Ink II-1 except for changing the composition as described in Table 1-2. Specifically, the organic solvent X, compound Z, other solvents, wax, and surfactant were stir-mixed first, the pigment dispersion and ion-exchange water were stir-mixed therein next, and the water-dispersible resin was further stir-mixed therein last. Each resulting mixture was subjected to pressure filtration using a polyvinylidene fluoride membrane filter having an average pore diameter of 1.2 m to remove coarse particles and foreign substances. Thus, Inks II-2 to II-19 and Example Inks RII-1 to RII-3 were prepared.

TABLE 1-1

| | | Example Inks | | | | | | | | | | |
|---|---|---|---|---|---|---|---|---|---|---|---|---|
| | Materials | I-1 | I-2 | I-3 | I-4 | I-5 | I-6 | I-7 | I-8 | I-9 | I-10 | I-11 |
| Pigment Dispersion | PD-1 Black Dispersion | 40.00 | | | | 40.00 | 40.00 | 40.00 | 40.00 | 40.00 | 40.00 | 40.00 |
| | PD-2 Black Dispersion | | | | | | | | | | | |
| | PD-3 Black Dispersion | | | | | | | | | | | |
| | PD-4 Cyan Dispersion | | 30.00 | | | | | | | | | |
| | PD-5 Magenta Dispersion | | | 40.00 | | | | | | | | |
| | PD-6 Yellow Dispersion | | | | 30.00 | | | | | | | |
| Water-dispersible Resin | Resin Particle Dispersion 1 | 5.00 | 5.00 | 5.00 | 5.00 | 5.00 | 5.00 | 5.00 | 5.00 | 5.00 | 5.00 | 5.00 |
| | Copolymer R-3 Dispersion | | | | | | | | | | | |
| Organic Solvent X | Formula (5) | | | | 18.00 | | | | | | | |
| | Formula (3-1) | | 30.00 | | | | | | | | | |
| | Formula (3-2) | | | 24.00 | | | | | | | | |
| | Formula (3-3) | | | | | | | | | | | |
| | Formula (4-1) | 24.00 | | | | 24.00 | 24.00 | | | 10.00 | 10.00 | 32.00 |
| | Formula (4-2) | | | | | | | | | | | |
| | 2-Ethyl-1,3-hexanediol | | | | | | | 24.00 | | | | |
| | 2,2,4-Trimethyl-1,3-pentanediol | | | | | | | | 24.00 | | | |

TABLE 1-1-continued

|  | Materials | | | | | | | | | | | |
|---|---|---|---|---|---|---|---|---|---|---|---|---|
| Compound Z | Propylene Glycol Monopropyl Ether | 5.00 | | | 5.00 | 5.00 | 5.00 | 5.00 | 18.00 | 15.00 | 4.00 | |
| | Propylene Glycol Monomethyl Ether | | | 5.00 | | | | | | | | |
| | Propylene Glycol Monoethyl Ether | | | | 5.00 | | | | | | | |
| | Propylene Glycol Monobutyl Ether | | 4.00 | | | | | | | | | |
| Other Solvent (Moisturizer) | Glycerin | 3.00 | | 8.00 | | 5.00 | 3.00 | 3.00 | 3.00 | 4.00 | 7.00 | 1.00 |
| | Triethylene Glycol | 5.00 | | | 11.00 | | 5.00 | 5.00 | 5.00 | 5.00 | 5.00 | |
| Surfactant | Formula (6-2) | | 2.00 | | | | | | | | | |
| | Formula (6-4) | | | 2.00 | | | | | | | | |
| | Formula (6-5) | | | | 2.00 | | | | | | | |
| | TEGO Wet 270 | 2.00 | | | 5.00 | | 2.00 | 2.00 | 2.00 | 2.00 | 2.00 | 2.00 |
| | UNIDYNE DSN403N | | | | | 2.00 | | | | | | |
| Solvent | Ion-exchange Water | 16.00 | 29.00 | 16.00 | 29.00 | 16.00 | 16.00 | 16.00 | 16.00 | 16.00 | 16.00 | 16.00 |
| | Total (parts by mass) | 100.00 | 100.00 | 100.00 | 100.00 | 100.00 | 100.00 | 100.00 | 100.00 | 100.00 | 100.00 | 100.00 |

|  |  | Example Inks | | | | | | | | Comparative Example Inks | | |
|---|---|---|---|---|---|---|---|---|---|---|---|---|
|  | Materials | I-12 | I-13 | I-14 | I-15 | I-16 | I-17 | I-18 | I-19 | RI-1 | RI-2 | RI-3 |
| Pigment Dispersion | PD-1 Black Dispersion | 40.00 | 40.00 | 30.00 | 30.00 | 10.00 | 9.00 | | | 40.00 | | |
| | PD-2 Black Dispersion | | | | | | | 40.00 | | | | |
| | PD-3 Black Dispersion | | | | | | | | 40.00 | | | 40.00 |
| | PD-4 Cyan Dispersion | | | | | | | | | | 40.00 | |
| | PD-5 Magenta Dispersion | | | | | | | | | | | |
| | PD-6 Yellow Dispersion | | | | | | | | | | | |
| Water-dispersible Resin | Resin Particle Dispersion 1 | 5.00 | 5.00 | 5.00 | 5.00 | | | 5.00 | | 5.00 | 5.00 | 5.00 |
| | Copolymer R-3 Dispersion | | | | | | | | 5.00 | | | |
| Organic Solvent X | Formula (5) | | | | | | | | | | | |
| | Formula (3-1) | | | | | | | | | | | |
| | Formula (3-2) | | | | | | | | | | | |
| | Formula (3-3) | | 24.00 | | | | | | | | | |
| | Formula (4-1) | 35.00 | | 5.00 | 10.00 | 45.00 | 46.00 | 24.00 | 24.00 | | | 24.00 |
| | Formula (4-2) | | | | | | | | | | | |
| | 2-Ethyl-1,3-hexanediol | | | | | | | | | | | |
| | 2,2,4-Trimethyl-1,3-pentanediol | | | | | | | | | | | |
| Compound Z | Propylene Glycol Monopropyl Ether | 4.00 | | 5.00 | 5.00 | 6.00 | 6.00 | 5.00 | 5.00 | 5.00 | 5.00 | 5.00 |
| | Propylene Glycol Monomethyl Ether | | | | | | | | | | | |
| | Propylene Glycol Monoethyl Ether | | | | | | | | | | | |
| | Propylene Glycol Monobutyl Ether | | | | | | | | | | | |
| Other Solvent (Moisturizer) | Glycerin | | 8.00 | 23.00 | 21.00 | | | 3.00 | 3.00 | 3.00 | 3.00 | 3.00 |
| | Triethylene Glycol | | 5.00 | 23.00 | 23.00 | | | 5.00 | 5.00 | 5.00 | 5.00 | 5.00 |
| Surfactant | Formula (6-2) | | | | | | | | | | | |
| | Formula (6-4) | | | | | | | | | | | |
| | Formula (6-5) | | | | | | | | | | | |
| | TEGO Wet 270 | 2.00 | 2.00 | 2.00 | 2.00 | 2.00 | 0.20 | 2.00 | 2.00 | 2.00 | 2.00 | 2.00 |
| | UNIDYNE DSN403N | | | | | | | | | | | |
| Solvent | Ion-exchange Water | 14.00 | 16.00 | 7.00 | 4.00 | 37.00 | 38.80 | 16.00 | 16.00 | 40.00 | 40.00 | 16.00 |
| | Total (parts by mass) | 100.00 | 100.00 | 100.00 | 100.00 | 100.00 | 100.00 | 100.00 | 100.00 | 100.00 | 100.00 | 100.00 |

TABLE 1-2

|  |  | Example Inks | | | | | | | | | | |
|---|---|---|---|---|---|---|---|---|---|---|---|---|
|  | Materials | II-1 | II-2 | II-3 | II-4 | II-5 | II-6 | II-7 | II-8 | II-9 | II-10 | II-11 |
| Pigment Dispersion | PD-1 Black Dispersion | 40.00 | | | | 40.00 | 40.00 | 40.00 | 40.00 | 40.00 | 40.00 | 40.00 |
| | PD-2 Black Dispersion | | | | | | | | | | | |
| | PD-3 Black Dispersion | | | | | | | | | | | |
| | PD-4 Cyan Dispersion | | 30.00 | | | | | | | | | |
| | PD-5 Magenta Dispersion | | | 40.00 | | | | | | | | |
| | PD-6 Yellow Dispersion | | | | 30.00 | | | | | | | |

TABLE 1-2-continued

| | Materials | | | | | | | | | | | |
|---|---|---|---|---|---|---|---|---|---|---|---|---|
| Water-dispersible Resin | Resin Particle Dispersion 1 | 5.00 | 5.00 | 5.00 | 5.00 | 5.00 | 5.00 | 5.00 | 5.00 | 5.00 | 5.00 | 5.00 |
| | Copolymer R-3 Dispersion | | | | | | | | | | | |
| Organic Solvent X | Formula (5) | | | | 18.00 | | | | | | | |
| | Formula (3-1) | | 30.00 | | | | | | | | | |
| | Formula (3-2) | | | 24.00 | | | | | | | | |
| | Formula (3-3) | | | | | | | | | | | |
| | Formula (4-1) | 24.00 | | | | 24.00 | 24.00 | | | 10.00 | 10.00 | 32.00 |
| | Formula (4-2) | | | | | | | | | | | |
| | 2-Ethyl-1,3-hexanediol | | | | | | | 24.00 | | | | |
| | 2,2,4-Trimethyl-1,3-pentanediol | | | | | | | | 24.00 | | | |
| Compound Z | Propylene Glycol Monopropyl Ether | 5.00 | | | | 5.00 | 5.00 | 5.00 | 5.00 | 18.00 | 15.00 | 4.00 |
| | Propylene Glycol Monomethyl Ether | | | 5.00 | | | | | | | | |
| | Propylene Glycol Monoethyl Ether | | | | 5.00 | | | | | | | |
| | Propylene Glycol Monobutyl Ether | | 4.00 | | | | | | | | | |
| Other Solvent (Moisturizer) | Glycerin | 3.00 | | 8.00 | | 5.00 | 3.00 | 3.00 | 3.00 | 4.00 | 7.00 | 1.00 |
| | Triethylene Glycol | 5.00 | | | 11.00 | | 5.00 | 5.00 | 5.00 | 5.00 | 5.00 | |
| Wax | AQUACER 531 | 0.67 | 0.67 | 0.67 | 0.67 | | | | | | | |
| | AQUACER 515 | | | | | 0.86 | 1.43 | 1.14 | 0.57 | | | |
| | SELOSOL 524 | | | | | | | | | 1.00 | | |
| | NOPCOTEPEM-17 | | | | | | | | | | 0.75 | |
| | HYTEC E-8237 | | | | | | | | | | | 0.75 |
| | HYTEC P-9018 | | | | | | | | | | | |
| Surfactant | Formula (6-2) | | 2.00 | | | | | | | | | |
| | Formula (6-4) | | | | 2.00 | | | | | | | |
| | Formula (6-5) | | | 2.00 | | | | | | | | |
| | TEGO Wet 270 | 2.00 | | | | 5.00 | | 2.00 | 2.00 | 2.00 | 2.00 | 2.00 |
| | UNIDYNE DSN403N | | | | | | 2.00 | | | | | |
| Solvent | Ion-exchange Water | 15.33 | 28.33 | 15.33 | 28.33 | 15.14 | 14.57 | 14.86 | 15.43 | 15.00 | 15.25 | 15.25 |
| | Total (parts by mass) | 100.00 | 100.00 | 100.00 | 100.00 | 100.00 | 100.00 | 100.00 | 100.00 | 100.00 | 100.00 | 100.00 |

| | | Example Inks | | | | | | | | Comparative Example Inks | | |
|---|---|---|---|---|---|---|---|---|---|---|---|---|
| | Materials | II-12 | II-13 | II-14 | II-15 | II-16 | II-17 | II-18 | II-19 | RII-1 | RII-2 | RII-3 |
| Pigment Dispersion | PD-1 Black Dispersion | 40.00 | 40.00 | 30.00 | 30.00 | 10.00 | 9.00 | | | 40.00 | | |
| | PD-2 Black Dispersion | | | | | | | 40.00 | | | | |
| | PD-3 Black Dispersion | | | | | | | | 40.00 | | | 40.00 |
| | PD-4 Cyan Dispersion | | | | | | | | | | 40.00 | |
| | PD-5 Magenta Dispersion | | | | | | | | | | | |
| | PD-6 Yellow Dispersion | | | | | | | | | | | |
| Water-dispersible Resin | Resin Particle Dispersion 1 | 5.00 | 5.00 | 5.00 | 5.00 | | | 5.00 | | 5.00 | 5.00 | 5.00 |
| | Copolymer R-3 Dispersion | | | | | | | | 5.00 | | | |
| Organic Solvent X | Formula (5) | | | | | | | | | | | |
| | Formula (3-1) | | | | | | | | | | | |
| | Formula (3-2) | | | | | | | | | | | |
| | Formula (3-3) | | 24.00 | | | | | | | | | |
| | Formula (4-1) | 35.00 | | 5.00 | 10.00 | 45.00 | 46.00 | 24.00 | 24.00 | | | 24.00 |
| | Formula (4-2) | | | | | | | | | | | |
| | 2-Ethyl-1,3-hexanediol | | | | | | | | | | | |
| | 2,2,4-Trimethyl-1,3-pentanediol | | | | | | | | | | | |
| Compound Z | Propylene Glycol Monopropyl Ether | 4.00 | | 5.00 | 5.00 | 6.00 | 6.00 | 5.00 | 5.00 | 5.00 | 5.00 | 5.00 |
| | Propylene Glycol Monomethyl Ether | | | | | | | | | | | |
| | Propylene Glycol Monoethyl Ether | | | | | | | | | | | |
| | Propylene Glycol Monobutyl Ether | | | | | | | | | | | |
| Other Solvent (Moisturizer) | Glycerin | | 8.00 | 23.00 | 21.00 | | | 3.00 | 3.00 | 3.00 | 3.00 | 3.00 |
| | Triethylene Glycol | | 5.00 | 23.00 | 23.00 | | | 5.00 | 5.00 | 5.00 | 5.00 | 5.00 |
| Wax | AQUACER 531 | | | | | | | 0.56 | 0.56 | 0.67 | 0.67 | 0.67 |
| | AQUACER 515 | | 1.43 | 0.47 | 0.29 | 0.57 | 0.29 | | | | | |
| | SELOSOL 524 | | | | | | | | | | | |
| | NOPCOTEPEM-17 | | | | | | | | | | | |
| | HYTEC E-8237 | | | | | | | | | | | |
| | HYTEC P-9018 | 0.86 | | | | | | | | | | |
| Surfactant | Formula (6-2) | | | | | | | | | | | |
| | Formula (6-4) | | | | | | | | | | | |
| | Formula (6-5) | | | | | | | | | | | |

TABLE 1-2-continued

| | | | | | | | | | | | | |
|---|---|---|---|---|---|---|---|---|---|---|---|---|
| | TEGO Wet 270 | 200 | 2.00 | 2.00 | 2.00 | 2.00 | 0.20 | 2.00 | 2.00 | 2.00 | 2.00 | 2.00 |
| | UNIDYNE DSN403N | | | | | | | | | | | |
| Solvent | Ion-exchange Water | | 13.14 | 14.57 | 6.53 | 3.71 | 36.43 | 38.51 | 15.44 | 15.44 | 39.33 | 39.33 | 15.33 |
| | Total (parts by mass) | | 100.00 | 100.00 | 100.00 | 100.00 | 100.00 | 100.00 | 100.00 | 100.00 | 100.00 | 100.00 | 100.00 |

Details of the materials described in Tables 1-1 and 1-2 are listed below.

AQUACER 531: Polyethylene wax (available from BYK Japan KK, having a melting point of 130° C. and containing 45% of active ingredients)

AQUACER 515: Polyethylene wax (available from BYK Japan KK, having a melting point of 135° C. and containing 35% of active ingredients)

SELOSOL 524: Carnauba wax (available from Chukyo Yushi Co., Ltd., having a melting point of 83° C. and containing 30% of active ingredients)

NOPCOTE PEM-17: Polyolefin wax (available from San Nopco Limited, having a melting point of 105° C. and containing 40% of active ingredients)

HYTEC E-8237: Polypropylene wax (available from Toho Chemical Industry Co., Ltd., having a melting point of 106° C. and containing 40% of active ingredients)

HYTEC P-9018: Polypropylene wax (available from Toho Chemical Industry Co., Ltd., having a melting point of 156° C. and containing 35% of active ingredients)

TEGO Wet 270: Polyether-modified siloxane compound (available from Evonik Japan Co., Ltd., containing 100% of active ingredients)

UNIDYNE DSN403N: Polyoxyethylene perfluoroalkyl ether (available from Daikin Industries, Ltd., containing 100% of active ingredients)

Examples I-1 to I-19, Comparative Examples I-1 to I-4, Examples II-1 to II-19, and Comparative Examples II-1 to II-4

Solubility parameters and physical properties of the inks of Examples I-1 to I-19, Comparative Examples I-2 to I-4, Examples II-1 to II-19, and Comparative Examples II-2 to II-4 are described in Tables 2-1 and 2-2. Note that the inks of Comparative Examples of I-1 and II-1 are omitted in Tables 2-1 and 2-2 because they are the same as the inks of Example I-1 and II-1, respectively.

Measurement of Dynamic Surface Tension

Dynamic surface tension was measured by a maximum bubble pressure method when a bubble lifetime is 15 msec, using an instrument SITA DynoTester (available from SITA Messtechnik GmbH) at 25° C.

Measurement of Static Surface Tension

Static surface tension was measured with an automatic surface tensiometer (DY-300 available from Kyowa Interface Science Co., Ltd.) at 25° C.

TABLE 2-1

| | Ink Name | Ink Color | Organic Solvent X | SP | Content of Organic Solvent X [wt %] | Solvent X/ (Water + Solvent X) [wt %] |
|---|---|---|---|---|---|---|
| Example I-1 | I-1 | Black | Formula (4-1) | 11.31 | 24.00 | 32.4 |
| Example I-2 | I-2 | Cyan | Formula (3-1) | 9.03 | 30.00 | 35.3 |
| Example I-3 | I-3 | Magenta | Formula (3-2) | 9.0 | 24.00 | 32.4 |
| Example I-4 | I-4 | Yellow | Formula (5) | 10.3 | 18.00 | 24.7 |
| Example I-5 | I-5 | Black | Formula (4-1) | 11.31 | 24.00 | 32.4 |
| Example I-6 | I-6 | Black | Formula (4-1) | 11.31 | 24.00 | 32.4 |
| Example I-7 | I-7 | Black | 2-Ethyl-1,3-hexanediol | 10.6 | 24.00 | 32.4 |
| Example I-8 | I-8 | Black | 2,2,4-Trimethyl-1,3-pentanedlol | 10.8 | 24.00 | 32.4 |
| Example I-9 | I-9 | Black | Formula (4-1) | 11.31 | 10.00 | 16.7 |
| Example I-10 | I-10 | Black | Formula (4-1) | 11.31 | 10.00 | 16.7 |
| Example I-11 | I-11 | Black | Formula (4-1) | 11.31 | 32.00 | 39.0 |
| Example I-12 | I-12 | Black | Formula (4-1) | 11.31 | 35.00 | 42.2 |
| Example I-13 | I-13 | Black | Formula (3-3) | 8.96 | 24.00 | 28.6 |
| Example I-14 | I-14 | Black | Formula (4-1) | 11.31 | 5.00 | 13.2 |
| Example I-15 | I-15 | Black | Formula (4-1) | 11.31 | 10.00 | 25.0 |
| Example I-16 | I-16 | Black | Formula (4-1) | 11.31 | 45.00 | 50.0 |
| Example I-17 | I-17 | Black | Formula (4-1) | 11.31 | 46.00 | 50.0 |
| Example I-18 | I-18 | Black | Formula (4-1) | 11.31 | 24.00 | 32.4 |
| Example I-19 | I-19 | Black | Formula (4-1) | 11.31 | 24.00 | 32.4 |
| Comparative Example I-2 | RI-1 | Black | — | — | 0.00 | 0.0 |
| Comparative Example I-3 | RI-2 | Cyan | — | — | 0.00 | 0.0 |
| Comparative Example I-4 | RI-3 | Black | Formula (4-1) | 11.31 | 24.00 | 32.4 |

| | Compaound Z | Content of Compound Z [wt %] | Total Content of Organic Solvenr X and Compound Z [wt %] | Organic Solvent X/ Compound Z Mass Ratio | Static Surface Tension of Ink [mN/m] | Dynamic Surface Tension of Ink [mN/m] |
|---|---|---|---|---|---|---|
| Example I-1 | Propylene Glycol Monopropyl Ether | 5.00 | 29.00 | 4.80 | 23.2 | 31.1 |

TABLE 2-1-continued

| | | | | | | |
|---|---|---|---|---|---|---|
| Example I-2 | Propylene Glycol Monobutyl Ether | 4.00 | 34.00 | 7.50 | 23.0 | 33.0 |
| Example I-3 | Propylene Glycol Monomethyl Ether | 5.00 | 29.00 | 4.80 | 21.0 | 30.9 |
| Example I-4 | Propylene Glycol Monoethyl Ether | 5.00 | 23.00 | 3.60 | 22.5 | 32.4 |
| Example I-5 | Propylene Glycol Monopropyl Ether | 5.00 | 29.00 | 4.80 | 19.4 | 28.5 |
| Example I-6 | Propylene Glycol Monopropyl Ether | 5.00 | 29.00 | 4.80 | 24.2 | 33.3 |
| Example I-7 | Propylene Glycol Monopropyl Ether | 5.00 | 29.00 | 4.80 | 22.5 | 34.4 |
| Example I-8 | Propylene Glycol Monopropyl Ether | 5.00 | 29.00 | 4.80 | 23.4 | 31.7 |
| Example I-9 | Propylene Glycol Monopropyl Ether | 18.00 | 28.00 | 0.56 | 21.1 | 30.0 |
| Example I-10 | Propylene Glycol Monopropyl Ether | 15.00 | 25.00 | 0.67 | 22.4 | 31.2 |
| Example I-11 | Propylene Glycol Monopropyl Ether | 4.00 | 36.00 | 8.00 | 22.2 | 32.3 |
| Example I-12 | Propylene Glycol Monopropyl Ether | 4.00 | 39.00 | 8.75 | 23.2 | 30.2 |
| Example I-13 | — | | 0.00 | 24.00 | — | 20.1 | 32.1 |
| Example I-14 | Propylene Glycol Monopropyl Ether | 5.00 | 10.00 | 1.00 | 20.3 | 29.9 |
| Example I-15 | Propylene Glycol Monopropyl Ether | 5.00 | 15.00 | 2.00 | 21.1 | 28.9 |
| Example I-16 | Propylene Glycol Monopropyl Ether | 6.00 | 51.00 | 7.50 | 26.7 | 33.9 |
| Example I-17 | Propylene Glycol Monopropyl Ether | 6.00 | 52.00 | 7.67 | 27.2 | 33.5 |
| Example I-18 | Propylene Glycol Monopropyl Ether | 5.00 | 29.00 | 4.80 | 23.0 | 30.2 |
| Example I-19 | Propylene Glycol Monopropyl Ether | 5.00 | 29.00 | 4.80 | 22.5 | 33.0 |
| Comparative Example I-2 | Propylene Glycol Monopropyl Ether | 5.00 | 5.00 | 0.00 | 23.2 | 31.1 |
| Comparative Example I-3 | Propylene Glycol Monopropyl Ether | 5.00 | 5.00 | 0.00 | 23.4 | 32.5 |
| Comparative Example I-4 | Propylene Glycol Monopropyl Ether | 5.00 | 29.00 | 4.80 | 21.2 | 33.0 |

TABLE 2-2

| | Ink Name | Orgaic Solvent X | SP | Solvent X/ (Water + Solvent X) [wt %] | Wax Type | Melting Point [° C.] |
|---|---|---|---|---|---|---|
| Example II-1 | II-1 | Formula (4-1) | 11.31 | 32.4 | AQUACER 531 | 130 |
| Example II-2 | II-2 | Formula (3-1) | 9.03 | 35.3 | AQUACER 531 | 130 |
| Example II-3 | II-3 | Formula (3-2) | 9.0 | 32.4 | AQUACER 531 | 130 |
| Example II-4 | II-4 | Formula (5) | 10.3 | 24.7 | AQUACER 531 | 130 |
| Example II-5 | II-5 | Formula (4-1) | 11.31 | 32.4 | AQUACER 515 | 135 |
| Example II-6 | II-6 | Formula (4-1) | 11.31 | 32.4 | AQUACER 515 | 135 |
| Example II-7 | II-7 | 2-Ethyl-1,3-hexanediol | 10.6 | 32.4 | AQUACER 515 | 135 |
| Example II-8 | II-8 | 2,2,4-Trimethyl-1,3-pentanediol | 10.8 | 32.4 | AQUACER 515 | 135 |
| Example II-9 | II-9 | Formula (4-1) | 11.31 | 16.7 | SELOSOL 524 | 83 |
| Example II-10 | II-10 | Formula (4-1) | 11.31 | 16.7 | NOPCOTEPEM-17 | 105 |
| Example II-11 | II-11 | Formula (4-1) | 11.31 | 39.0 | HYTEC E-8237 | 106 |
| Example II-12 | II-12 | Formula (4-1) | 11.31 | 42.2 | HYTEC P-9018 | 156 |
| Example II-13 | II-13 | Formula (3-3) | 8.96 | 28.6 | AQUACER 515 | 135 |
| Example II-14 | II-14 | Formula (4-1) | 11.31 | 13.2 | AQUACER 515 | 135 |
| Example II-15 | II-15 | Formula (4-1) | 11.31 | 25.0 | AQUACER 515 | 135 |
| Example II-16 | II-16 | Formula (4-1) | 11.31 | 50.0 | AQUACER 515 | 135 |
| Example II-17 | II-17 | Formula (4-1) | 11.31 | 50.0 | AQUACER 515 | 135 |
| Example II-18 | II-18 | Formula (4-1) | 11.31 | 32.4 | AQUACER 531 | 130 |
| Example II-19 | II-19 | Formula (4-1) | 11.31 | 32.4 | AQUACER 531 | 130 |
| Comparative Example II-2 | RII-1 | — | — | 0.0 | AQUACER 531 | 130 |
| Comparative Example II-3 | RII-2 | — | — | 0.0 | AQUACER 531 | 130 |
| Comparative Example II-4 | RII-3 | Formula (4-1) | 11.31 | 32.4 | AQUACER 531 | 130 |

TABLE 2-2-continued

|  | x/w | Compound Z | Organic Solvent X/Compound Z Mass Ratio | Static Surface Tension of Ink [mN/m] | Dynamic Surface Tension of Ink [mN/m] |
| --- | --- | --- | --- | --- | --- |
| Example II-1 | 80 | Propylene Glycol Monopropyl Ether | 4.80 | 23.0 | 31.1 |
| Example II-2 | 100 | Propylene Glycol Monobutyl Ether | 7.50 | 23.1 | 33.1 |
| Example II-3 | 80 | Propylene Glycol Monomethyl Ether | 4.80 | 21.2 | 31.0 |
| Example II-4 | 60 | Propylene Glycol Monoethyl Ether | 3.60 | 22.3 | 32.1 |
| Example II-5 | 80 | Propylene Glycol Monopropyl Ether | 4.80 | 19.5 | 28.8 |
| Example II-6 | 48 | Propylene Glycol Monopropyl Ether | 4.80 | 24.2 | 33.2 |
| Example II-7 | 60 | Propylene Glycol Monopropyl Ether | 4.80 | 22.4 | 34.5 |
| Example II-8 | 120 | Propylene Glycol Monopropyl Ether | 4.80 | 23.1 | 31.8 |
| Example II-9 | 33 | Propylene Glycol Monopropyl Ether | 0.56 | 21.3 | 30.2 |
| Example II-10 | 33 | Propylene Glycol Monopropyl Ether | 0.67 | 22.3 | 31.5 |
| Example II-11 | 107 | Propylene Glycol Monopropyl Ether | 8.00 | 22.0 | 32.4 |
| Example II-12 | 116 | Propylene Glycol Monopropyl Ether | 8.75 | 23.0 | 30.1 |
| Example II-13 | 48 | — | — | 20.5 | 32.0 |
| Example II-14 | 30 | Propylene Glycol Monopropyl Ether | 1.00 | 20.1 | 29.8 |
| Example II-15 | 99 | Propylene Glycol Monopropyl Ether | 2.00 | 21.0 | 28.8 |
| Example II-16 | 226 | Propylene Glycol Monopropyl Ether | 7.50 | 26.8 | 33.7 |
| Example II-17 | 453 | Propylene Glycol Monopropyl Ether | 7.67 | 27.5 | 33.6 |
| Example II-18 | 95 | Propylene Glycol Monopropyl Ether | 4.80 | 23.2 | 30.2 |
| Example II-19 | 95 | Propylene Glycol Monopropyl Ether | 4.80 | 22.6 | 33.1 |
| Comparative Example II-2 | 0 | Propylene Glycol Monopropyl Ether | 0.00 | 23.2 | 32.6 |
| Comparative Example II-3 | 0 | Propylene Glycol Monopropyl Ether | 0.00 | 21.4 | 33.2 |
| Comparative Example II-4 | 80 | Propylene Glycol Monopropyl Ether | 4.80 | 20.6 | 33.5 |

In Examples I-1 to I-19 and Comparative Examples I-2 to I-4, an ink discharge device having a circulation-type discharge head (described below) was used to form images with the respective inks described in Table 2-1, and the images were subjected to the following evaluations. The results are presented in Table 3-1.

Ink Discharge Device with Circulation-Type Discharge Head

Each ink listed in Table 2-1 was set in an inkjet printer (IPSIO GX-e5500 available from Ricoh Co., Ltd.) that had been modified to include the circulation-type head illustrated in FIGS. 3 to 11. A print chart having a print area ratio of 5% was printed on 1,000 sheets by this printer. After a lapse of 24 hours from completion of the printing, beading resistance, drying property, continuous discharge reliability, and maintenance ink consumption were evaluated. The evaluation criteria are described below. During the evaluation, the ink was always circulated regardless of whether the circulation-type discharge head is in operation or not. The results of Examples I-1 to I-19 and Comparative Examples I-2 to I-4 are presented in Table 3-1.

Ink Discharge Device without Circulation-Type Discharge Head

The ink I-1 was set in a commercially-available inkjet printer (IPSIO GX-e5500 available from Ricoh Co., Ltd.) equipped with a non-circulation-type discharge head. A print chart having a print area ratio of 5% was printed on 1,000 sheets by this printer. After a lapse of 24 hours from completion of the printing, beading resistance, drying property, continuous discharge reliability, and maintenance ink consumption were evaluated. The evaluation criteria are described below. The results of Comparative Example I-1 are presented in Table 3-1.

Beading Resistance

A solid image in a 5-cm square shape having a resolution of 300 dpi×300 dpi was formed on each of a recording medium 1 (OK TOP COAT+ available from Oji Paper Co., Ltd., having a basis weight of 104.7 g/m²) and a recording medium 2 (LumiArt Gloss 90 gsm available from Stora Enso) by discharging 4.0 pL of the ink per pixel. The solid image was visually observed to evaluate the degree of beading. Beading resistance was evaluated based on the following criteria.

Evaluation Criteria

AA: No beading was observed.

A: A very slight degree of beading was observed from a distance of 15 cm but unobserved from a distance of 50 cm.

B: A slight degree of beading was observed from a distance of 50 cm but unobserved from a distance of 1 m.

C: A considerable degree of beading was observed from a distance of 1 m.

Drying Property

Solid images were printed on the two types of recording media in the same manner as in the evaluation of beading resistance. The printed images were dried in a thermostatic chamber having an inner temperature of 100° C. for 30 seconds. Immediately after the drying, a 4-cm square blank sheet was put on each printed image, a 2-cm square rubber sheet having a thickness of 0.2 mm was further put on the center of the blank sheet, and a weight was further put on the rubber sheet so that the rubber sheet pressurizes the blank sheet with a pressure of 0.5 kgf/cm². The printed image thus pressurized was left to stand at 23° C., 50% RH for 12 hours. The blank sheet was removed thereafter and visually observed to determine the degree of pigment transfer from the printed image. Drying property was evaluated based on the following criteria.

Evaluation Criteria

AA: Almost no pigment transfer was observed. The sheets were not stuck to each other.

A: Almost no pigment transfer was observed, but the sheets were stuck to each other.

B: Pigment transfer was slightly observed (on less than 10% of the sheet by area).

C: Pigment transfer was clearly observed (on 10% or more of the sheet by area).

Continuous Discharge Reliability

The above ink discharge device conducted dummy discharge of liquid droplets from all nozzles for 1 hour. A nozzle check pattern was thereafter printed by the ink discharge device on an inkjet glossy paper (KASSAI SYASHIN-SHIAGE (Photofinishing) VALUE available from FUJIFILM Corporation) to determine the number of nozzles from which the ink had been discharged out of all 384 nozzles. Continuous discharge reliability was evaluated based on the following criteria.

Evaluation Criteria

A: The number of nozzles from which the ink had been discharged was not less than 368. (No problem in practical use.)

B: The number of nozzles from which the ink had been discharged was not less than 192 and less than 368.

C: The number of nozzles from which the ink had been discharged was less than 192.

Maintenance Ink Consumption

The above ink discharge device was left to stand in a thermostatic chamber at 50° C. for 1 hour. A nozzle check pattern was thereafter printed by the ink discharge device on an inkjet glossy paper (KASSAI SYASHIN-SHIAGE (Photofinishing) VALUE available from FUJIFILM Corporation) to check the condition of missing nozzle. The ink was thereafter sucked by a suction cap at a suction pressure of −25 kPa-s for 1 second. The nozzle check pattern was printed again and the condition of missing nozzle was checked again. Suction of the ink and printing of the nozzle check pattern were repeated until missing nozzle was eliminated. Maintenance ink consumption needed for completely recovering the nozzles was evaluated by the number of times that suction was performed based on the following criteria.

A: The number of times that suction was performed was zero (i.e., no missing nozzle was observed) or the nozzles completely recovered after one time of suction.

B: The nozzles completely recovered after 2 to 5 times of suction.

C: The nozzles completely recovered or not recovered after 6 or more times of suction.

Abrasion Resistance

Solid images were printed on the two types of recording media in the same manner as in the evaluation of beading resistance. The printed images were dried in a thermostatic chamber having an inner temperature of 100° C. for 30 seconds. The images were rubbed back and forth 5 times with a piece of white cotton cloth with a load of 900 g using a crock meter CM-1 (available from Toyo Seiki Seisaku-sho, Ltd.). The rubbed image was visually observed to determine abrasion resistance based on the following criteria.

A: The image had not been detached and there was no dirt around the image.

B: The image had almost not been detached and there was a slight degree of dirt around the image.

C: The image had been detached and there was a considerable degree of dirt around the image.

TABLE 3-1

| | Ink Name | Ink Color | Beading on Recording Medium 1 | Beading on Recording Medium 2 | Drying Property on Recording Medium 1 | Drying Property on Recording Medium 2 | Continuous Discharge Reliablity | Maintenance Ink Consumption | Abrasion Resistance on Recording Medium 1 | Abrasion Resistance on Recording Medium 2 |
|---|---|---|---|---|---|---|---|---|---|---|
| Example I-1 | I-1 | Black | AA | AA | AA | AA | A | A | A | A |
| Example I-2 | I-2 | Cyan | AA | AA | AA | AA | A | A | A | A |
| Example I-3 | I-3 | Magenta | AA | AA | AA | AA | A | A | A | A |
| Example I-4 | I-4 | Yellow | AA | AA | AA | AA | A | A | A | A |
| Example I-5 | I-5 | Black | AA | AA | AA | AA | B | A | A | B |
| Example I-6 | I-6 | Black | A | A | AA | AA | A | A | A | B |
| Example I-7 | I-7 | Black | AA | A | A | A | A | A | B | B |
| Example I-8 | I-8 | Black | A | AA | A | A | A | A | B | B |
| Example I-9 | I-9 | Black | A | A | A | A | A | A | B | B |
| Example I-10 | I-10 | Black | AA | AA | A | AA | A | A | A | B |
| Example I-11 | I-11 | Black | AA | AA | A | AA | A | A | A | B |
| Example I-12 | I-12 | Black | A | A | A | A | A | A | B | B |
| Example I-13 | I-13 | Black | A | A | A | A | B | B | B | B |
| Example I-14 | I-14 | Black | A | B | B | B | A | A | B | B |
| Example I-15 | I-15 | Black | AA | AA | A | A | A | A | B | B |
| Example I-16 | I-16 | Black | A | A | AA | AA | A | A | B | B |
| Example I-17 | I-17 | Black | A | B | A | B | B | A | B | B |
| Example I-18 | I-18 | Black | B | B | B | B | A | A | B | B |
| Example I-19 | I-19 | Black | A | AA | AA | AA | A | A | A | B |
| Comparative Example I-1 | I-1 | Black | A | A | A | A | C | C | A | B |
| Comparative Example I-2 | RI-1 | Black | C | C | C | C | A | A | C | C |
| Comparative Example I-3 | RI-2 | Cyan | C | C | C | C | A | A | C | C |
| Comparative Example I-4 | RI-3 | Black | C | C | C | C | C | C | A | B |

Comparison between Example I-1 and Comparative Example I-1 indicates that the evaluation results in "continuous discharge reliability" and "maintenance ink consumption" are improved when the circulation-type discharge head is used. A reason for this is considered that defective discharge, that may be caused when bubbles come into the nozzles, is prevented. In the circulation-type discharge head, the ink is always circulated and bubbles are easily discharged, thus preventing defective discharge caused by bubbles. In addition, since the ink present near the nozzles is always circulated, the ink is suppressed from locally thickening at the nozzles. Therefore, there is no need to discard the ink, thereby reducing maintenance ink consumption.

In Examples II-1 to II-19 and Comparative Examples II-2 to II-4, the ink discharge device having a circulation-type discharge head that is used in Example I-1 was used to form images with the respective inks described in Table 2-2, and the images were evaluated in the same manner as in Example I-1.

In Comparative Example II-1, the ink discharge device having a non-circulation-type discharge head that is used in Comparative Example I-1 was used to form images with the ink II-1, and the images were evaluated in the same manner as in Comparative Example I-1.

The results are presented in Table 3-2.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An ink discharge device comprising:
   an ink comprising:
      water;
      a colorant;
      an organic solvent X having a solubility parameter of from 8.9 to 12.0, the organic solvent X comprising no glycol ether compound; and
      a copolymer comprising a structural unit represented by the following formula (1):

TABLE 3-2

|  | Ink Name | Ink Color | Beading on Recording Medium 1 | Beading on Recording Medium 2 | Drying Property on Recording Medium 1 | Drying Property on Recording Medium 2 | Continuous Discharge Reliablity | Maintenance Ink Consumption | Abrasion Resistance on Recording Medium 1 | Abrasion Resistance on Recording Medium 2 |
|---|---|---|---|---|---|---|---|---|---|---|
| Example II-1 | II-1 | Black | AA | AA | AA | AA | A | A | A | A |
| Example II-2 | II-2 | Cyan | AA | AA | AA | AA | A | A | A | A |
| Example II-3 | II-3 | Magenta | AA | AA | AA | AA | A | A | A | A |
| Example II-4 | II-4 | Yellow | AA | AA | AA | AA | A | A | A | A |
| Example II-5 | II-5 | Black | AA | AA | AA | AA | B | A | A | A |
| Example II-6 | II-6 | Black | A | A | AA | AA | A | A | A | A |
| Example II-7 | II-7 | Black | AA | A | A | A | A | A | A | A |
| Example II-8 | II-8 | Black | A | AA | A | A | A | A | A | B |
| Example II-9 | II-9 | Black | A | A | AA | A | B | A | B | B |
| Example II-10 | II-10 | Black | AA | A | AA | AA | A | A | A | A |
| Example II-11 | II-11 | Black | AA | AA | A | AA | A | A | A | A |
| Example II-12 | II-12 | Black | A | A | A | A | A | A | A | A |
| Example II-13 | II-13 | Black | A | A | A | A | B | B | A | B |
| Example II-14 | II-14 | Black | A | B | B | B | A | A | A | A |
| Example II-15 | II-15 | Black | AA | AA | A | A | A | A | A | A |
| Example II-16 | II-16 | Black | AA | A | AA | A | A | A | A | B |
| Example II-17 | II-17 | Black | A | B | A | B | B | A | B | B |
| Example II-18 | II-18 | Black | B | A | B | A | A | A | A | A |
| Example II-19 | II-19 | Black | A | AA | AA | AA | A | A | A | A |
| Comparative Example II-1 | II-1 | Black | A | A | A | A | C | C | A | B |
| Comparative Example II-2 | RII-1 | Black | C | C | C | C | A | A | C | C |
| Comparative Example II-3 | RII-2 | Cyan | C | C | C | C | A | A | C | C |
| Comparative Example II-4 | RII-3 | Black | C | C | C | C | C | C | A | B |

Formula (1)

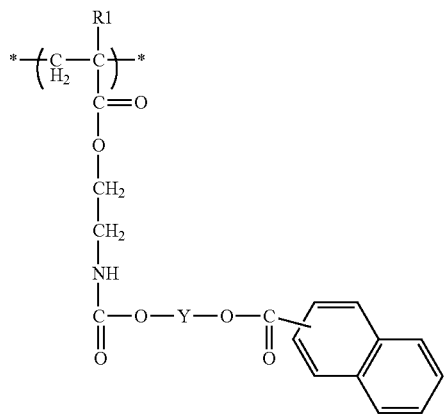

where R1 represents a hydrogen atom or methyl group and Y represents an alkylene group having 2 to 18 carbon atoms;
an ink discharge head including:
  a nozzle configured to discharge the ink;
  a plurality of individual liquid chambers in communication with the nozzle;
  a flow-in channel configured to let the ink flow into the individual liquid chambers; and
  a flow-out channel configured to let the ink flow out from the individual liquid chambers; and
a negative pressure generator configured to generate a negative pressure that lets the ink flow out from the individual liquid chambers,
wherein the ink discharge head is configured to let the ink having flowed out from the flow-out channel flow into the flow-in channel to circulate the ink.

2. The ink discharge device of claim 1, wherein the copolymer further comprises another structural unit represented by the following formula (2):

Formula (2)

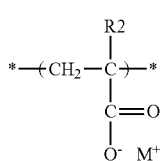

where R2 represents a hydrogen or methyl group and M represents a hydrogen atom, alkali metal, or organic ammonium.

3. The ink discharge device of claim 1, wherein a proportion of the organic solvent X to a total of the water and the organic solvent X is 20% by mass or more.

4. The ink discharge device of claim 1, wherein the ink further comprises a glycol ether compound Z that exhibits a vapor pressure of 50 mm Hg or more at 100° C.

5. The ink discharge device of claim 4, wherein the glycol ether compound Z includes at least one member selected from the group consisting of propylene glycol monopropyl ether, propylene glycol monomethyl ether, propylene glycol monoethyl ether, and propylene glycol monobutyl ether.

6. The ink discharge device of claim 4, wherein a mass ratio of the organic solvent X to the glycol ether compound Z ranges from 1/1 to 8/1.

7. The ink discharge device of claim 1, wherein the organic solvent X includes at least one member selected from the group consisting of compounds represented by any one of the following formulae (3), (4), and (5):

Formula (3)

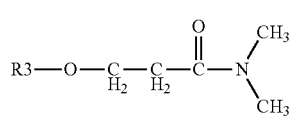

where R3 represents an alkyl group having 4 to 6 carbon atoms;

Formula (4)

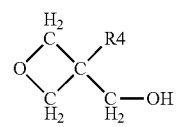

where R4 represents an alkyl group having 1 to 2 carbon atoms; and

Formula (5)

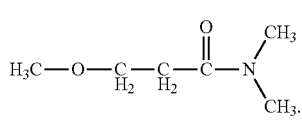

8. The ink discharge device of claim 1, wherein the ink further comprises a wax, and a mass ratio of the organic solvent X to the wax ranges from 30 to 500.

9. The ink discharge device of claim 8, wherein the wax has a melting point of from 100° C. to 140° C.

10. The ink discharge device of claim 1, wherein the ink further comprises a polyether-modified siloxane compound.

11. The ink discharge device of claim 1, wherein the ink has a static surface tension of 20 mN/m or more and a dynamic surface tension of 34 mN/m or less, the dynamic surface tension being measured by a maximum bubble pressure method when a bubble lifetime is 15 msec.

12. An ink discharge method comprising:
  letting an ink flow into multiple individual liquid chambers in communication with a nozzle via a flow-in channel;
  letting the ink flow out from the multiple individual liquid chambers via a flow-out channel;
  generating a negative pressure that lets the ink flow out from the individual liquid chambers; and
  letting the ink having flowed out from the flow-out channel flow into the flow-in channel to circulate the ink,
  wherein the ink comprises:
    water;
    a colorant;
    an organic solvent X having a solubility parameter of from 8.9 to 12.0, the organic solvent comprising no glycol ether compound; and
    a copolymer comprising a structural unit represented by the following formula (1):

Formula (1)
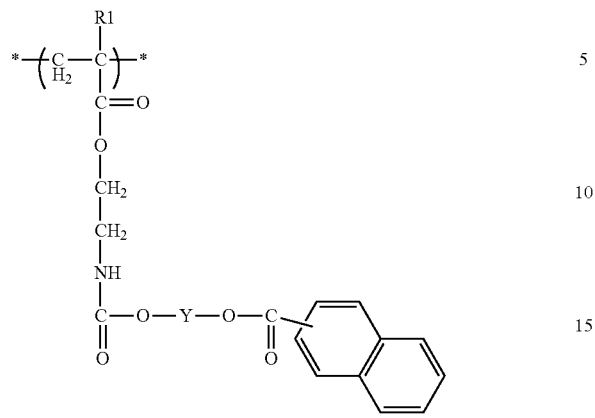
where R1 represents a hydrogen atom or methyl group and Y represents an alkylene group having 2 to 18 carbon atoms.
* * * * *